(12) United States Patent
Tanaka

(10) Patent No.: US 11,560,050 B2
(45) Date of Patent: Jan. 24, 2023

(54) LID OPENING AND CLOSING DEVICE

(71) Applicant: U-Shin Ltd., Nagano (JP)

(72) Inventor: Yuki Tanaka, Hiroshima (JP)

(73) Assignee: U-SHIN LTD., Nagano (JP)

( * ) Notice: Subject to any disclaimer, the term of this patent is extended or adjusted under 35 U.S.C. 154(b) by 0 days.

(21) Appl. No.: 17/452,650

(22) Filed: Oct. 28, 2021

(65) Prior Publication Data

US 2022/0134874 A1 May 5, 2022

(30) Foreign Application Priority Data

Nov. 2, 2020 (JP) .............................. JP2020-183763

(51) Int. Cl.
*B60K 15/05* (2006.01)
*E05B 83/34* (2014.01)

(52) U.S. Cl.
CPC .............. *B60K 15/05* (2013.01); *E05B 83/34* (2013.01); *B60K 2015/0515* (2013.01); *B60K 2015/0561* (2013.01)

(58) Field of Classification Search
CPC ............ B60K 15/05; B60K 2015/0515; B60K 2015/0561; E05B 83/34
USPC ........................................................ 296/97.22
See application file for complete search history.

(56) References Cited

U.S. PATENT DOCUMENTS 9,515,418 B2 12/2016 Yoshizawa et al.
2016/0087375 A1 3/2016 Yoshizawa et al.

FOREIGN PATENT DOCUMENTS

| EP | 3079211 B1 * | 9/2020 | ............... B60K 1/04 |
| JP | 2014-210473 A | 11/2014 | |
| WO | WO-2014171035 A1 * | 10/2014 | ............... B60K 1/04 |

* cited by examiner

Primary Examiner — Mahmoud Gimie
(74) Attorney, Agent, or Firm — Pearne & Gordon LLP

(57) ABSTRACT

In the lid opening and closing device, the rotating body at the initial position rotates to one side in the rotation direction, so that the lock member is disengaged from the first link. Further, the first link and the rotating body are provided with a differential connecting mechanism, and the differential connecting mechanism connects the rotating body and the first link to operate the link mechanism at the retracted position after the lock member is disengaged from the first link, when the rotating body is rotating. As a result, the differential connecting mechanism imparts a time difference between the two operations of the rotating body. Therefore, the lock member and the link mechanism can be operated by rotationally driving the rotating body by a single actuator.

10 Claims, 17 Drawing Sheets

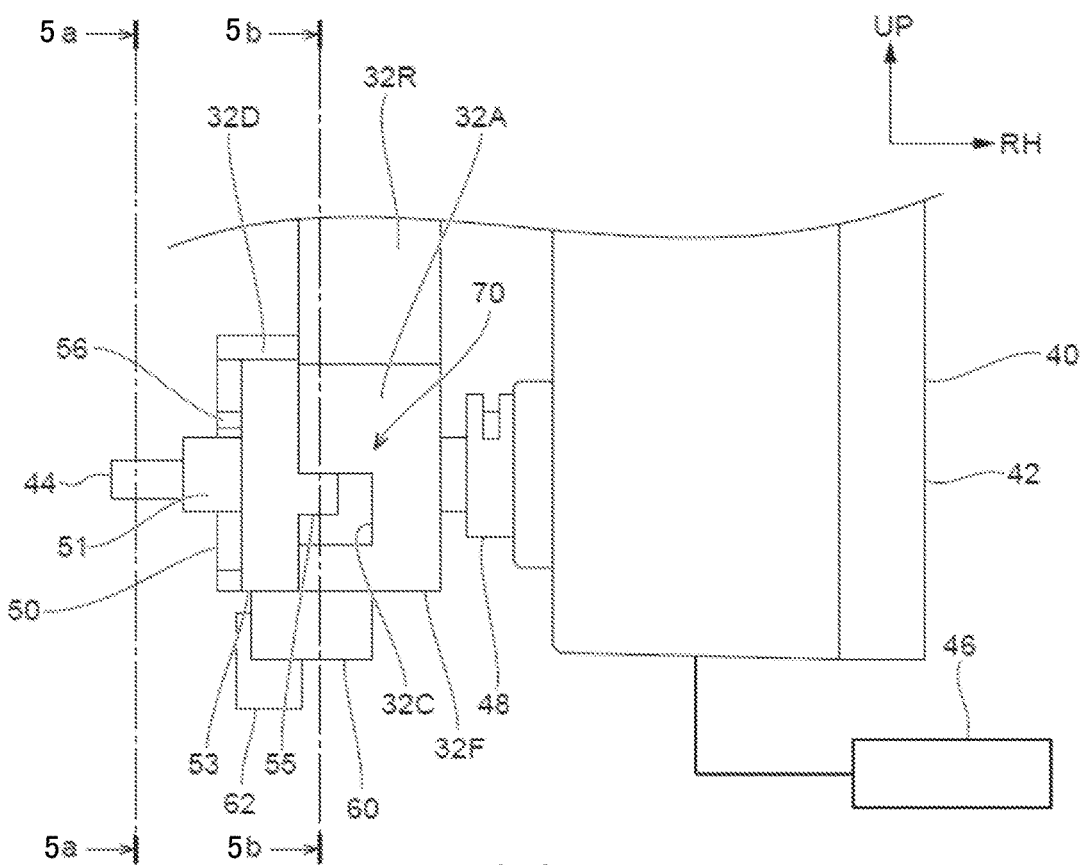
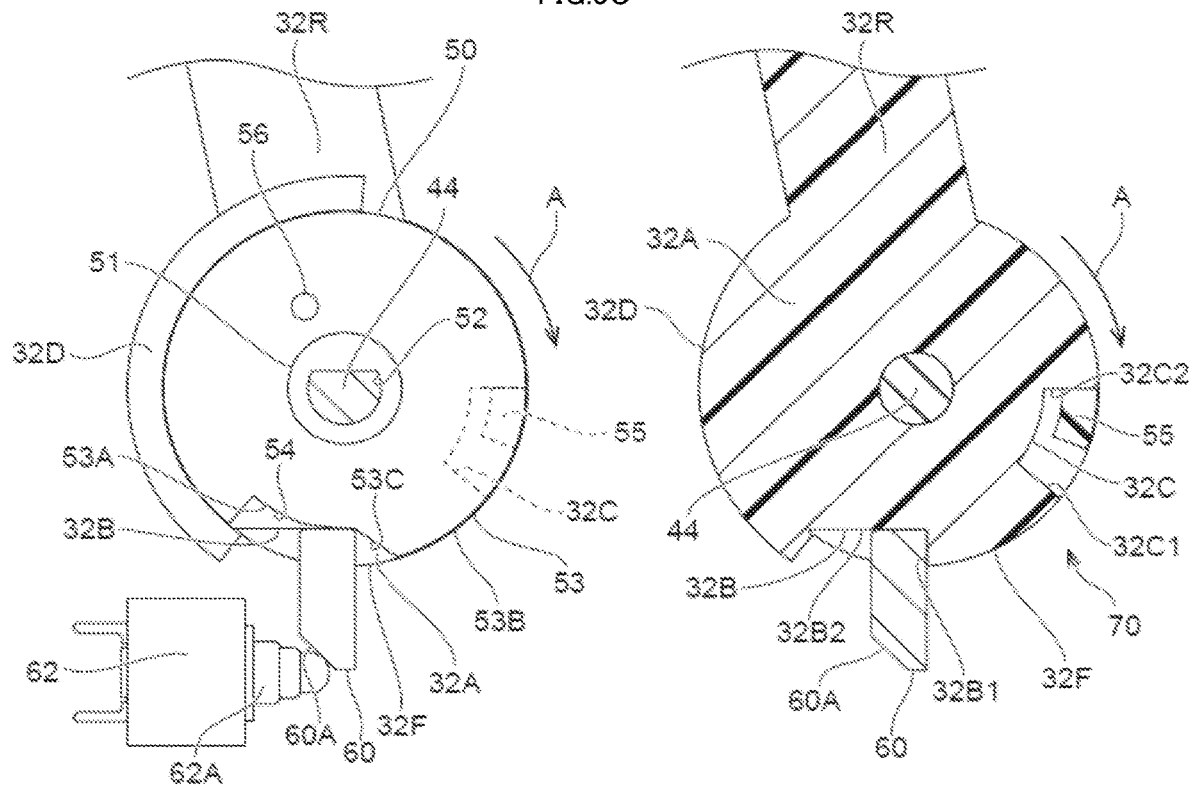
FIG.5A  FIG.5B  FIG.5C

LID OPENING AND CLOSING DEVICE

CROSS-REFERENCE TO RELATED APPLICATIONS

This application claims the benefit of Japanese Patent Application No. 2020-183763 filed on Nov. 2, 2020, the entire disclosure of which is hereby incorporated herein by reference.

BACKGROUND OF THE INVENTION

Field of the Invention

The present invention relates to a lid opening and closing device.

Description of the Related Art

The energy receiving port device (lid opening and closing device) described in Patent Document 1 below includes a lid that opens and closes an opening of a receiving port of a vehicle, and an opening and closing device that opens and closes the lid. Further, the opening and closing device comprises a link mechanism for connecting the vehicle body and the lid, and a motor (driving unit) for driving the link mechanism. When the driving force of the motor is transmitted to the link mechanism, the link mechanism is activated and the lid changes the receiving port from the closed state to the open state.

PRIOR ART DOCUMENT

[Patent Document 1]
Japanese Unexamined Patent Publication No. 2014-210473

SUMMARY OF INVENTION

Problems to be Solved by the Invention

Here, the energy receiving port device does not have a locking mechanism for blocking the operation of the lid in the closed state. Therefore, by providing the lock mechanism, the safety of the energy receiving port device can be enhanced. For example, a lock member that locks the lid in the closed state and a drive unit that drives the lock member can be separately provided to prevent the lid from operating in the closed state. However, in this case, since it is necessary to separately provide a drive unit for driving the lock member, there is a problem that the cost of the energy receiving port device is increased.

On the other hand, in the energy receiving port device above, by holding the lid in a closed state by a motor that opens and closes the lid, it is possible to prevent the closed lid from operating without separately providing a drive unit. However, in this case, the holding force for holding the lid in the locked state is relatively low. Therefore, it may not be possible to lock the lid stably.

In consideration of the above facts, an object of the present invention is to provide a lid opening and closing device capable of stably locking a lid while suppressing an increase in cost.

Means to Solve Problems

At least one embodiment of the present invention is a lid opening and closing device comprising: a lid provided in a receiving recess of a vehicle having a receiving portion inside, and configured to be movable between a closed position for closing the opening of the receiving recess and an open position for opening the opening; a link mechanism that connects the lid and the receiving recess, arranged at a retracted position stored inside the receiving recess at the closed position of the lid, and moves the lid to the open position by operating from the retracted position; a drive unit that serves as a drive source for operating the link mechanism; a lock member that engages with the link mechanism at the retracted position to prevent the link mechanism from operating; a rotating body that is rotationally driven by the drive unit, and rotates from the initial position to one side in the rotation direction to disengage the engagement of the lock member to the link mechanism; a differential connecting mechanism provided on the link mechanism and the rotating body, and connects the rotating body and the link mechanism to operate the link mechanism at the retracted position after the lock member is disengaged from the link mechanism when rotating from the initial position of the rotating body to one side in the rotation direction.

At least one embodiment of the present invention is the lid opening and closing device, wherein the differential connecting mechanism comprises: a differential groove provided on one of the rotating body and the link mechanism, and extending in the rotation direction of the rotating body, and a differential connecting shaft provided on the other of the rotating body and the link mechanism, and arranged at one end or the other end of the differential groove.

At least one embodiment of the present invention is the lid opening and closing device, wherein the drive unit has a drive shaft, the link mechanism has a drive link member with which the lock member is engaged, and one end of the drive link member is rotatably supported by the drive shaft, and the rotating body is integrally rotatably connected to the drive shaft.

At least one embodiment of the present invention is the lid opening and closing device, wherein the lock member is arranged on the radial outer side of the rotating body, and configured to be movable between a lock position that engages with the drive link member and an unlock position that is disengaged from the drive link member, and a cam surface is formed on the outer peripheral portion of the rotating body so that the lock member is in contact with the cam surface and the lock member is moved between the lock position and the unlock position.

At least one embodiment of the present invention is the lid opening and closing device, wherein the rotating body and the drive link member are arranged side by side in the axial direction of the drive shaft, the lock member is arranged so as to straddle the rotating body and the drive link member, and the drive link member is formed with an engaging recess that is open outward in the radial direction of the drive shaft and configured to be able to be engaged with the lock member.

At least one embodiment of the present invention is the lid opening and closing device, wherein the lid is provided with a reset portion protruding toward the receiving recess side, the rotating body is provided with a pressed portion configured to be pressable at the reset portion, and in a state where the rotating body is arranged on one side in the rotation direction from the initial position, the lid in the closed position is displaced toward the receiving recess side, so that the reset portion presses the pressed portion and the rotating body returns to the initial position.

Effects of the Invention

According at least one embodiment of the present invention, the lid can be stably locked while suppressing cost increase.

BRIEF DESCRIPTION OF DRAWINGS

FIGS. 5A-B are front sectional views, taken along lines 5a and 5b of FIG. 5C, respectively, seen from the front side which shows the connection state of the drive shaft of the actuator shown in FIG. 4, and the hinge part of the first link and the rotating body.

FIG. 5C is a side view of the actuator and the rotating body shown in FIG. 4.

EMBODIMENTS OF THE INVENTION

Figure 1:
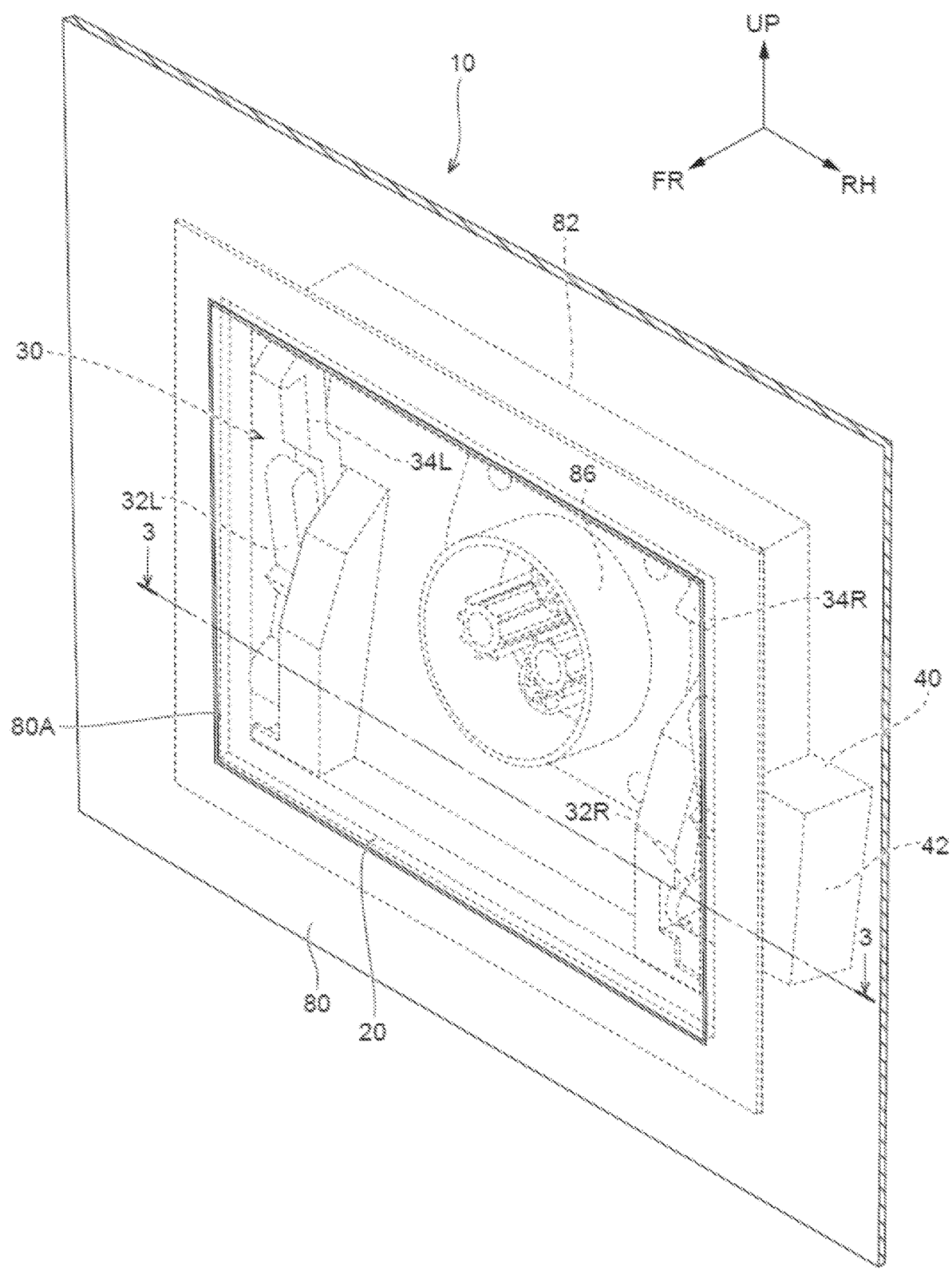
FIG. 1 is a perspective view which shows the lid opening and closing device according to the present embodiment.

Hereinafter, the lid opening and closing device 10 according to the present embodiment will be described with reference to the drawings. The arrows UP, FR, and RH, which are appropriately shown in the drawings, indicate the upper side, the front side, and the right side of the lid opening and closing device 10, respectively. In the following description, the vertical, front-back, and left-right directions of the lid opening and closing device 10 are used to indicate the up-down direction, front-back direction, and left-right direction of the lid opening and closing device 10 unless otherwise specified.

Figure 2:
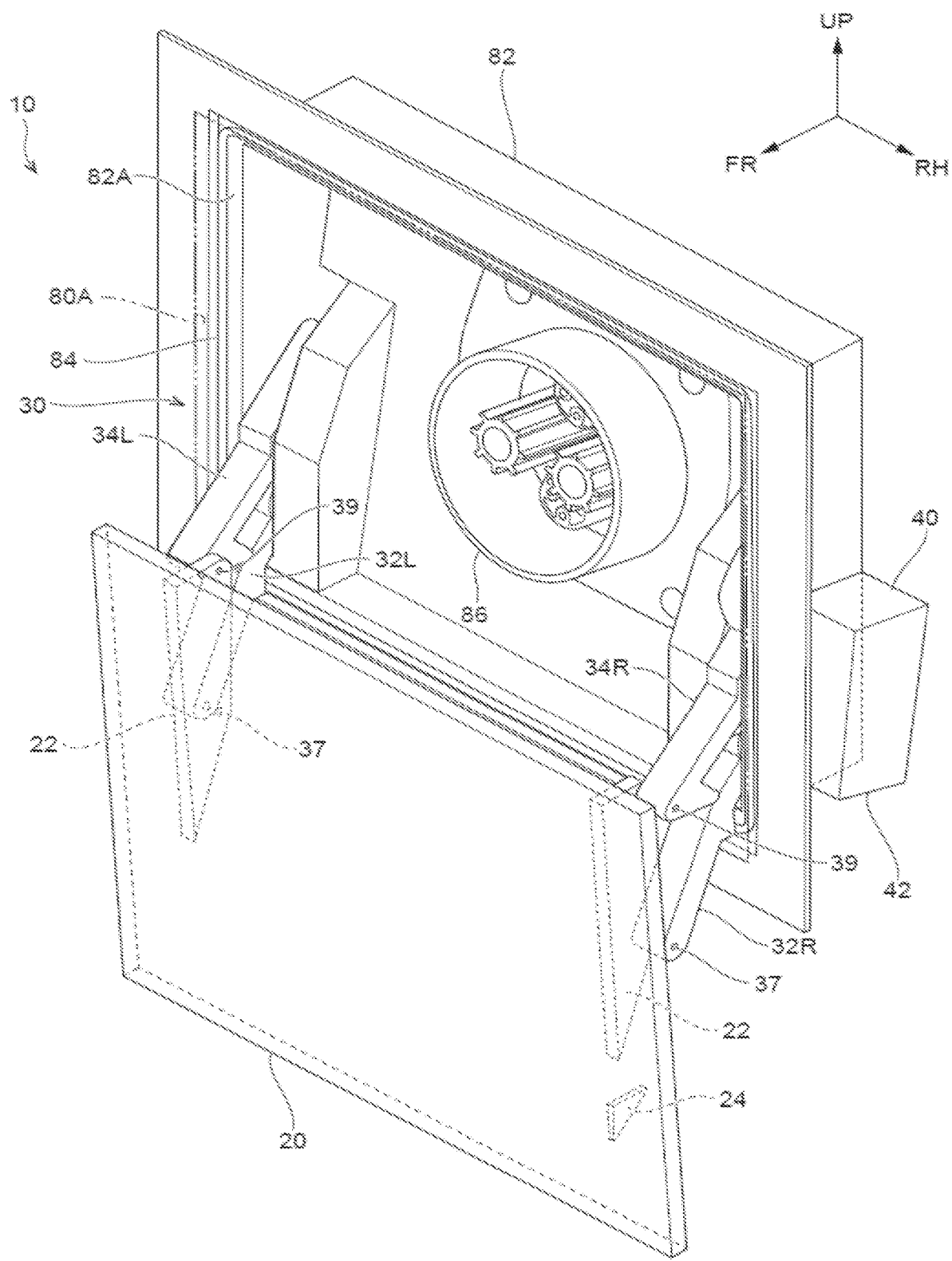
FIG. 2 is a perspective view which shows the state which the lid shown in FIG. 1 is arranged in an open position.
Figure 3:
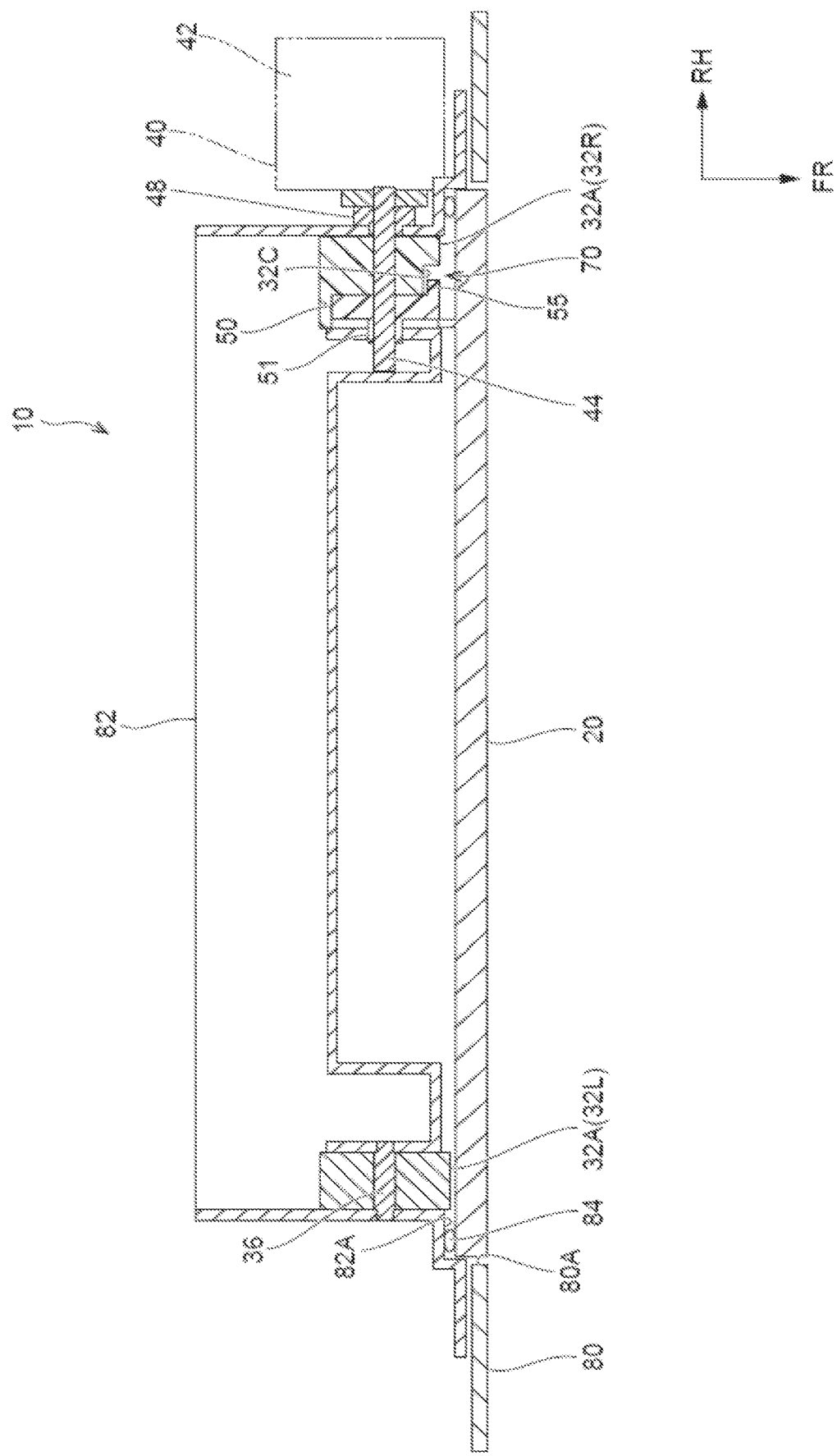
FIG. 3 is a plan sectional view (3-3 line sectional view of FIG. 1) seen from the upper side of the lid opening and closing device shown in FIG. 1.

As shown in FIGS. 1 and 2, the lid opening and closing device 10 is mounted on a vehicle (automobile) and is configured as a device for opening and closing the opening of the receiving recess 82 of the vehicle. In the vehicle, a rectangular hole 80A for exposing the receiving recess 82 is formed in the vehicle body panel 80 constituting the vehicle body. The receiving recess 82 is formed in a concave shape that is open to the front side, and is formed in a roughly rectangular shape when viewed from the front side. The receiving recess 82 is connected to the vehicle body panel 80 on the rear side of the vehicle body panel 80, and the receiving recess 82 is exposed from the hole 80A. A step portion 82A that is lowered by one step to the rear side is formed in the opening of the receiving recess 82, and the step portion 82A extends over the entire circumference of the receiving recess 82 in the circumferential direction. The step portion 82A is provided with an elastic seal member 84. The seal member 84 is formed in a roughly rectangular annular shape having a circular cross section, and extends all around the opening of the receiving recess 82 in the circumferential direction. Further, in the receiving recess 82, a receiving portion 86 for receiving the energy source of the vehicle is provided. The energy source of the vehicle includes, for example, electricity, gasoline, gas, hydrogen, and other substances that can be used as energy.

The lid opening and closing device 10 comprises a lid 20 that opens and closes the opening of the receiving recess 82, a link mechanism 30, an actuator 40 as a "driving unit", a rotating body 50, a lock member 60, and a differential connecting mechanism 70.

(Lid 20)

As shown in FIGS. 1-4, the lid 20 is formed in a roughly rectangular plate shape with the front-rear direction as the plate thickness direction. The lid 20 is connected to the receiving recess 82 by a link mechanism 30 described later, and is configured to open and close the opening of the receiving recess 82 by the operation of the link mechanism 30. Specifically, the lid 20 is configured to be movable between a closed position (position shown in FIG. 1) that closes the opening of the receiving recess 82 and an open position (position shown in FIG. 2) that opens the opening of the receiving recess 82. Further, in the closed position of the lid 20, the outer peripheral edge portion of the lid 20 is arranged adjacent to the front side of the seal member 84, and the seal member 84 seals between the lid 20 and the step portion 82A. In the following description, the lid 20 will be described as being arranged in the closed position.

Further, on the rear surface of the lid 20, a pair of left and right lid connecting pieces 22 for connecting the link mechanism 30 described later is provided. The lid connecting piece 22 is formed in a roughly long plate shape extending in the vertical direction with the left-right direction as the plate thickness direction, and protrudes from the upper portion of the lid 20 to the rear side. Further, on the rear surface of the lid 20, a pressing piece 24 as a "reset portion" is provided on the lower side of the lid connecting piece 22 on the right side. The pressing piece 24 is formed in a roughly triangular plate shape with the left-right direction as the plate thickness direction. Specifically, one side of the outer peripheral portion of the pressing piece 24 is configured as the pressing inclined portion 24A, and the pressing inclined portion 24A is inclined upward as it goes to the rear side when viewed from the left-right direction.

(Link Mechanism 30)

The link mechanism 30 is configured as a mechanism that connects the lid 20 and the receiving recess 82 to open and close the lid 20 between the closed position and the open position. Specifically, in the closed position of the lid 20, the link mechanism 30 is arranged in the retracted position stored in the receiving recess 82, and in the open position of the lid 20, the link mechanism 30 is arranged in the deployed position. The link mechanism 30 comprises a left and right pair of first links 32L and 32R, and a left and right pair of second links 34L and 34R. The first link 32R on the right side corresponds to the "drive link member" of the present invention.

The first links 32L and 32R are formed in a roughly long block shape with the left-right direction as the thickness direction, and extend roughly in the vertical direction on the rear side of the lid 20. One end (lower end) of the first links 32L and 32R is configured as a hinge portion 32A, and the outer peripheral portion of the hinge portion 32A is formed in a circular shape when viewed from the left-right direction. The hinge portion 32A of the first link 32R on the right side is rotatably supported at the central portion by the drive shaft 44 of the actuator 40 described later, and the hinge portion 32A of the first link 32L on the left side is rotatably supported at the central portion by a support shaft 36 provided in the receiving recess 82 (cf. FIG. 3). The drive shaft 44 and the support shaft 36 are arranged with the left-right direction as the axial direction and arranged coaxially. Further, the other end (upper end) of the first links 32L and 32R is arranged outside the lid connecting piece 22 of the lid 20 in the left-right direction, and rotatably supported by a support shaft 37 provided on the lid connecting piece 22 with the left-right direction as the axial direction. Further, in the operation of the link mechanism 30 from the retracted position to the deployed position, the first links 32L and 32R rotate around the axes of the drive shaft 44 and the support shaft 36 in one side in the rotation direction (arrow A direction side in FIG. 4).

As shown in FIGS. 5A-7, a lock recess 32B as an "engagement recess" is formed on the outer peripheral portion of the hinge portion 32A in the first link 32R on the right side, and the lock recess 32B is open to the outside in the radial direction and the left side of the hinge portion 32A.

Specifically, the lock recess 32B comprises a first lock surface 32B1 extending in the radial direction of the hinge portion 32A, and the second lock surface 32B2 extending rearward from the upper end of the first lock surface 32B1, when viewed from the left side.

Further, on the outer peripheral portion of the hinge portion 32A of the first link 32R on the right side, a differential groove 32C constituting the differential connecting mechanism 70 described later is formed on the other side in the rotation direction with respect to the lock recess 32B, and the differential groove 32C is open to the outside in the radial direction and the left side of the hinge portion 32A. Further, the differential groove 32C extends in the circumferential direction of the hinge portion 32A (the rotation direction of the rotating body 50 described later). As a result, the differential groove 32C has a first engaged surface 32C1 that constitutes a surface on one side in the rotation direction of the first link 32R in the differential groove 32C (cf. FIG. 5), and the second engaged surface 32C2 that constitutes the surface on the other side in the rotational direction of the first link 32R in the differential groove 32C (cf. FIG. 5).

Further, the hinge portion 32A of the first link 32R on the right side is integrally formed with a cover portion 32D that projects outward in the radial direction and projects to the left from the hinge portion 32A. The cover portion 32D extends along the circumferential direction of the hinge portion 32A with the radial direction of the hinge portion 32A as the plate thickness direction, and arranged on one side in the rotation direction of the first link 32R with respect to the lock recess 32B. Further, the portion of the hinge portion 32A on the other side in the rotation direction of the first link 32R with respect to the lock recess 32B is configured as a link side cam surface 32F (cf. FIG. 5), and the link side cam surface 32F is formed in an arc shape along the circumferential direction of the drive shaft 44, which will be described later.

Figure 4:
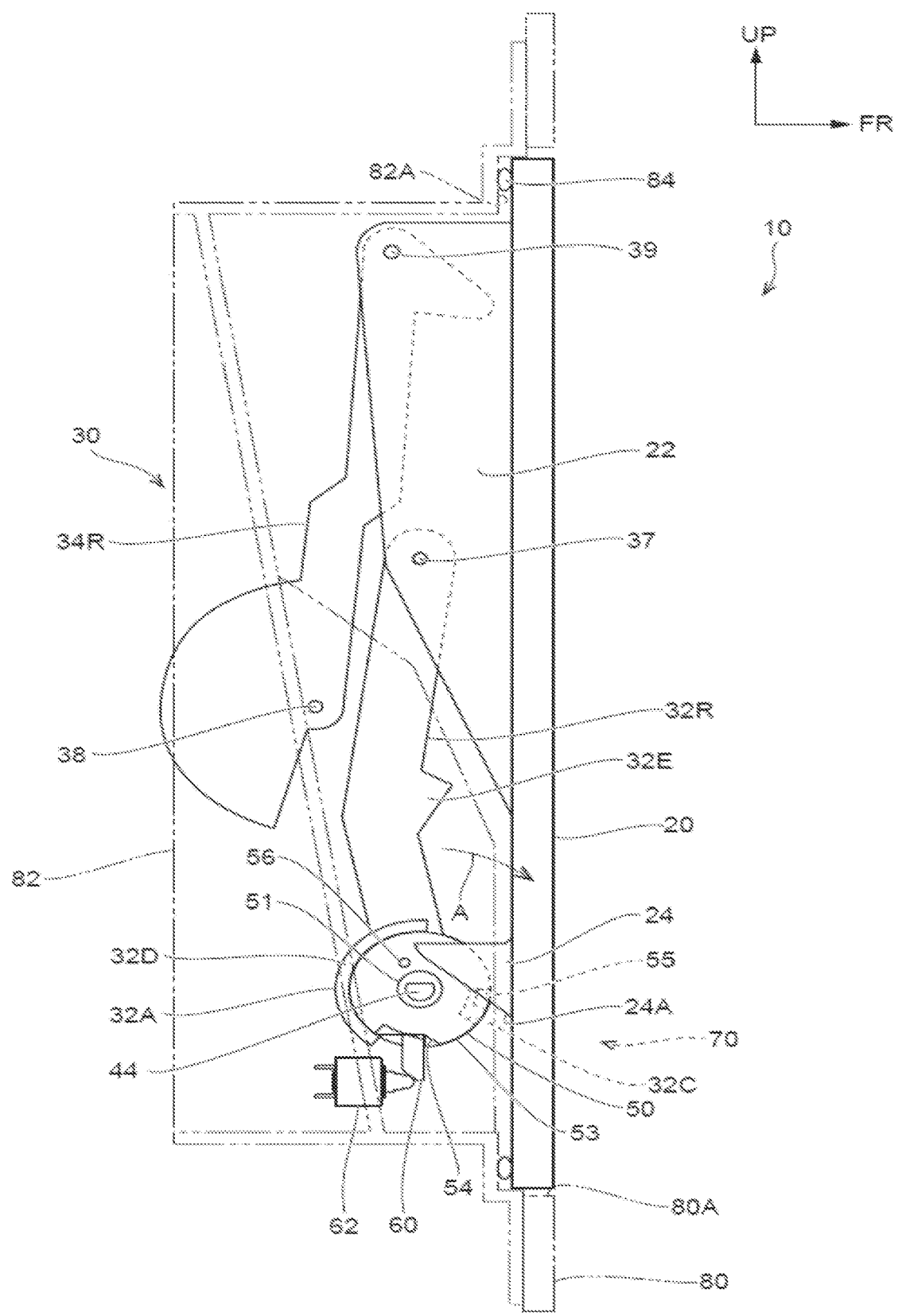
FIG. 4 is a side view seen from the left side which shows the link mechanism of the right side in the receiving recess shown in FIG. 1.
Figure 6:
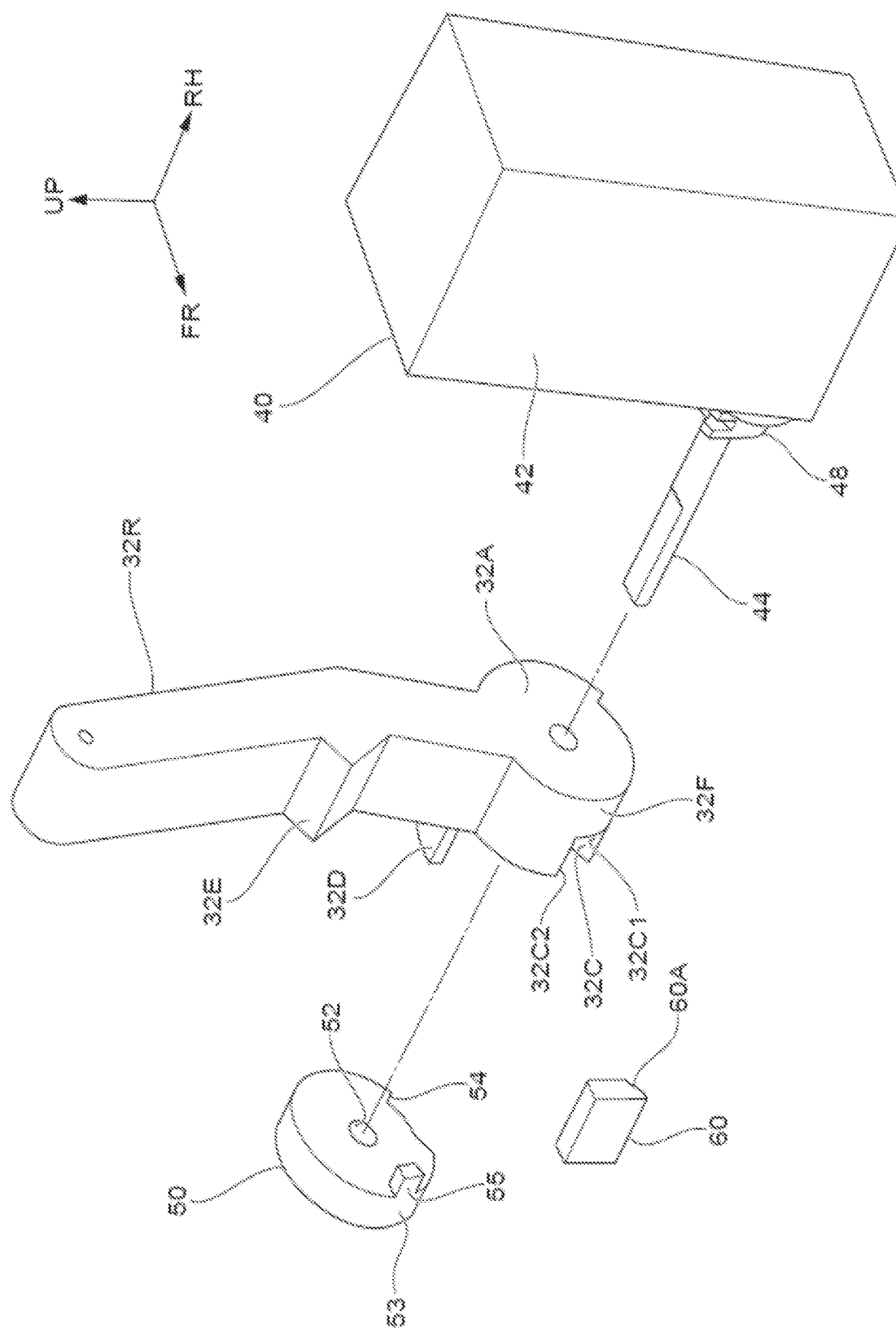
FIG. 6 is an exploded perspective view of the actuator, the first link, and the rotating body shown in FIGS. 5A-B as viewed from diagonally forward to the right.
Figure 7:
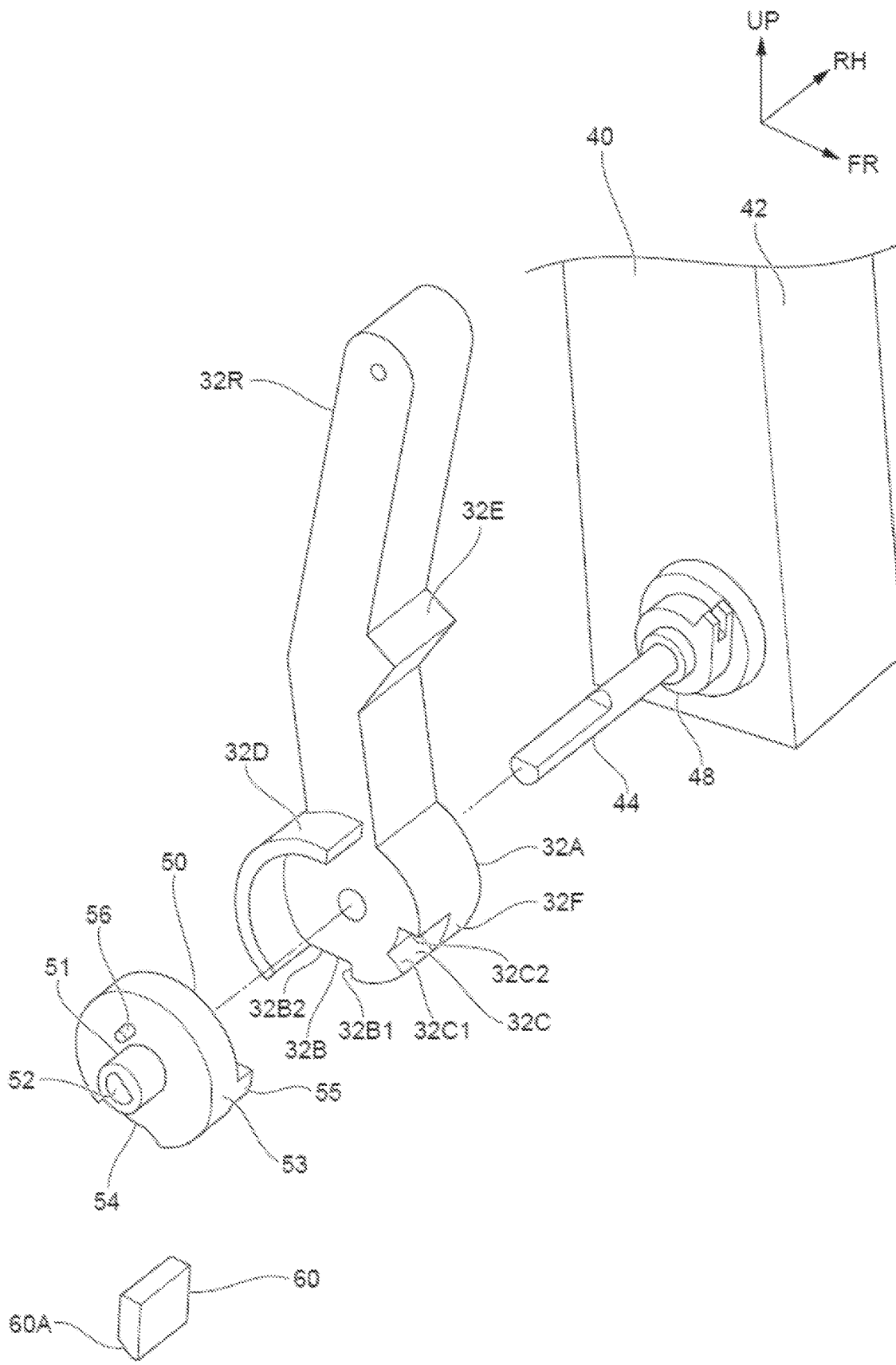
FIG. 7 is an exploded perspective view of the actuator, the first link, and the rotating body shown in FIGS. 5A-B as viewed from diagonally forward to the left.

As shown in FIG. 4, a stopper portion 32E is formed in the intermediate portion in the longitudinal direction of the first links 32L and 32R, and the stopper portion 32E projects forward from the first links 32L and 32R. The stopper portion 32E is formed in a roughly triangular shape when viewed from the left-right direction.

As shown in FIGS. 2 and 4, the second links 34L and 34R are formed in a roughly long block shape with the left-right direction as the thickness direction. The second links 34L and 34R are arranged above the first links 32L and 32R, respectively, and extends roughly vertically and is slightly inclined to the front as it goes upward when viewed from the left-right direction. One end (lower end) of the second links 34L and 34R is rotatably supported by a support shaft 38 provided in the receiving recess 82 with the left-right direction as the axial direction. The other end (upper end) of the second links 34L and 34R is arranged adjacent to the outer side in the left-right direction of the lid connecting piece 22 of the lid 20, and rotatably supported by a support shaft 39 provided at the upper end of the lid connecting piece 22 with the left-right direction as the axial direction.

By operating the link mechanism 30 at the retracted position, the lid 20 moves from the closed position to the open position, and the link mechanism 30 is arranged at the deployed position. Specifically, the first links 32L and 32R rotate one side in the rotation direction around the axes of the drive shaft 44 and the support shaft 36, and the second links 34L and 34R rotate around the axis of the support shaft 38 in one direction in the rotation direction. As a result, the lid 20 swings forward and downward from the closed position, and the opening of the receiving recess 82 is opened.

(Actuator 40)

As shown in FIGS. 3, and 5-7, the actuator 40 is configured as a drive source for the link mechanism 30. The actuator 40 comprises an actuator main body 42 and a drive shaft 44. The actuator main body 42 is arranged close to the right side of the receiving recess 82, and is fixed to the receiving recess 82 by a holder (not shown). The drive shaft 44 extends from the lower end portion of the actuator main body 42 to the left side with the left-right direction as the axial direction, and is arranged in the lower right portion of the receiving recess 82. The hinge portion 32A of the first link 32R on the right side described above is rotatably supported by the drive shaft 44. The actuator 40 is electrically connected to the control unit 46 of the vehicle, and the drive shaft 44 rotates around its own axis when the actuator 40 is operated by the control unit 46. The tip of the drive shaft 44 is formed in a D-shaped cross section.

An emergency lever 48 is integrally rotatably provided at the base end of the drive shaft 44 of the actuator 40. One end of a long cable (not shown) is connected to the emergency lever 48, and the other end of the cable is operably arranged in the vehicle interior of the vehicle. For example, in an emergency such as a failure of the actuator 40, the occupant can pull the other end of the cable to rotate the drive shaft 44 to one side in the rotation direction.

(Rotating Body 50)

As shown in FIGS. 3-7, rotating body 50 is configured as a member that advances and retreats the lock member 60, which will be described later, between the lock position and the unlock position. The rotating body 50 is formed in a roughly disk shape with the left-right direction as the thickness direction. The radius of the rotating body 50 coincides with the radius of the link side cam surface 32F of the first link 32R. A columnar shaft portion 51 projecting to the left is formed in the central portion of the rotating body 50. Further, a connecting hole 52 is formed through the central portion of the rotating body 50, and the connecting hole 52 is formed in a D-shaped cross section corresponding to the tip end side portion of the drive shaft 44. The tip of the drive shaft 44 is fitted into the connecting hole 52 from the right side, and the rotating body 50 is integrally rotatably connected to the drive shaft 44, and is arranged adjacent to the left side of the hinge portion 32A of the first link 32R on the right side. Further, in the state where the rotating body 50 is connected to the drive shaft 44, the rotating body 50 is arranged inside in the radial direction of the cover portion 32D of the first link 32R, and the shaft portion 51 of the rotating body 50 is rotatably supported by the receiving recess 82. At the retracted position of the link mechanism 30, the rotating body 50 is arranged at the initial position.

The outer peripheral portion of the rotating body 50 is configured as a cam surface 53. A cam recess 54 opened downward is formed on the cam surface 53, and the cam recess 54 penetrates in the left-right direction, and arranged on the left side of the lock recess 32B of the first link 32R. As a result, the cam surface 53 comprises the first cam surface 53A that constitutes the bottom surface of the cam recess 54, the second cam surface 53B which is one step higher than the first cam surface 53A outwardly in the radial direction of the rotating body 50, and an inclined cam surface 53C arranged between the first cam surface 53A and the second cam surface 53B and arranged on the other side in the rotation direction of the rotating body 50 with respect to the first cam surface 53A. The inclined cam surface 53C is inclined toward the other side in the rotation direction of the rotating body 50 as it goes outward in the radial direction of the rotating body 50. At the initial position of the rotating body 50, the inclined cam surface 53C is arranged on the other side in the rotation direction than the first lock surface 32B1 of the first link 32R, and the lock recess 32B of the first link 32R is arranged inside the cam recess 54 when viewed from the left side (cf. FIG. 5). Further, the first cam surface 53A is arranged radially inside the rotating body 50 than the second lock surface 32B2 of the first link 32R.

On the right side of the rotating body 50, a differential connecting shaft 55 constituting a differential connecting mechanism 70 described later is provided on the other side of the rotating body 50 in the rotation direction with respect to the cam recess 54. The differential connecting shaft 55 is formed in a roughly rectangular columnar shape and extends from the outer peripheral portion of the rotating body 50 to the right side. Specifically, the differential connecting shaft 55 has two side surfaces orthogonal to the circumferential direction of the rotating body 50, and two side surfaces orthogonal to the radial direction of rotation. The differential connecting shaft 55 is arranged at the other end of the differential groove 32C in the first link 32R, and arranged adjacent to one side in the rotation direction with respect to the second engaged surface 32C2 of the differential groove 32C.

The rotating body 50 is provided with a return pin 56 as a "pressed portion". The return pin 56 is formed in a roughly columnar shape with the left-right direction as the axial direction, and extends to the left side from the rotating body 50. Further, the return pin 56 is arranged close to the rear side of the pressing inclined portion 24A in the pressing piece 24 of the lid 20. Although the details will be described later, it is configured that when the lid 20 in the open position is manually moved to the closed position, the return pin 56 is pressed by the pressing piece 24 to return the rotating body 50 to the initial position.

(Lock Member 60)

As shown in FIGS. 5A-7, the lock member 60 is formed in a roughly rectangular plate shape with the front-rear direction as the plate thickness direction, and supported by a receiving recess 82 on the lower side of the hinge portion 32A of the first link 32R on the right side and the rotating body 50 so as to be relatively movable in the vertical direction. Specifically, the lock member 60 is configured to be movable between a lock position (position shown in FIGS. 5A-C) and an unlock position displaced downward from the lock position (positions shown in FIGS. 8b to 8d). Further, the lock member 60 is urged upward by a spring (not shown).

At the retracted position of the link mechanism 30, the lock member 60 is arranged at the lock position, and the upper end portion of the lock member 60 is arranged in the lock recess 32B of the first link 32R and the cam recess 54 of the rotating body 50. Specifically, the upper end portion of the lock member 60 is arranged adjacent to the first lock surface 32B1 of the lock recess 32B on one side in the rotation direction of the first link 32R and the rotating body 50. As a result, at the retracted position of the link mechanism 30, the lock member 60 restricts the rotation of the first link 32R to one side in the rotation direction, and the operation of the link mechanism 30 is prevented. Further, at the lock position of the lock member 60, the upper end portion of the lock member 60 is in contact with the second lock surface 32B2 of the lock recess 32B due to the urging force of the spring.

Further, a lower side inclined surface 60A is formed on the lower end surface of the lock member 60, and the lower side inclined surface 60A is inclined downward toward the front side when viewed from the left-right direction. Although the details will be described later, when the rotating body 50 rotates from the initial position to one side in the rotation direction, the lock member 60 is pressed by the inclined cam surface 53C of the rotating body 50 and is displaced from the locked position to the unlocked position.

Further, a detection switch 62 is provided on the lower side of the lock member 60, and the detection switch 62 is fixed to the receiving recess 82 and electrically connected to the control unit 46. The detection switch 62 has a switch portion 62A configured to be pressable to the rear side. At the lock position of the lock member 60, the switch portion 62A is arranged below the lock member 60. On the other hand, at the unlocked position of the lock member 60, the switch unit 62A is pressed rearward by the lower side inclined surface 60A of the lock member 60, and the detection switch 62 outputs an ON signal to the control unit 46. As a result, the control unit 46 detects the unlocked position of the lock member 60.

(Differential Connection Mechanism 70)

The differential connection mechanism 70 comprises the differential groove 32C of the first link 32R described above and the differential connecting shaft 55 of the rotating body 50. At the retracted position of the link mechanism 30, as described above, the differential connecting shaft 55 is arranged at the other end of the differential groove 32C. That is, the differential connecting shaft 55 is arranged so as to be separated from the first engaged surface 32C1 of the differential groove 32C on the other side in the rotation direction, and arranged adjacent to one side in the rotation direction with respect to the second engaged surface 32C2 of the differential groove 32C. Therefore, when the differential connecting shaft 55 moves between one end and the other end of the differential groove 32C, the rotating body 50 is configured to rotate relative to the first link 32R.

When the rotating body 50 rotates from the initial position to one side in the rotation direction and the differential connecting shaft 55 is arranged at one end of the differential groove 32C, the lock member 60 is displaced from the locked position to the unlocked position by the inclined cam surface 53C of the rotating body 50, and the upper end portion of the lock member 60 is set to abut on one end of the second cam surface 53B. Further, in this state, as the rotating body 50 further rotates to one side in the rotation direction, the differential connecting shaft 55 presses the first engaged surface 32C1 of the differential groove 32C so that the rotating body 50 and the first link 32R rotate to one side in the rotation direction. That is, the differential connecting mechanism 70 is configured as a mechanism for operating the link mechanism 30 by connecting the rotating body 50 and the link mechanism 30 after moving the lock member 60 from the locked position to the unlocked position, when rotating from the initial position of the rotating body 50 to one side in the rotation direction.

(Operation and Effect)

Next, the operation and effect of the present embodiment will be described while explaining the operation of the lid opening and closing device 10.

(Movement of Lid 20 from Closed Position to Open Position by Driving Actuator 40)

Figure 8A:
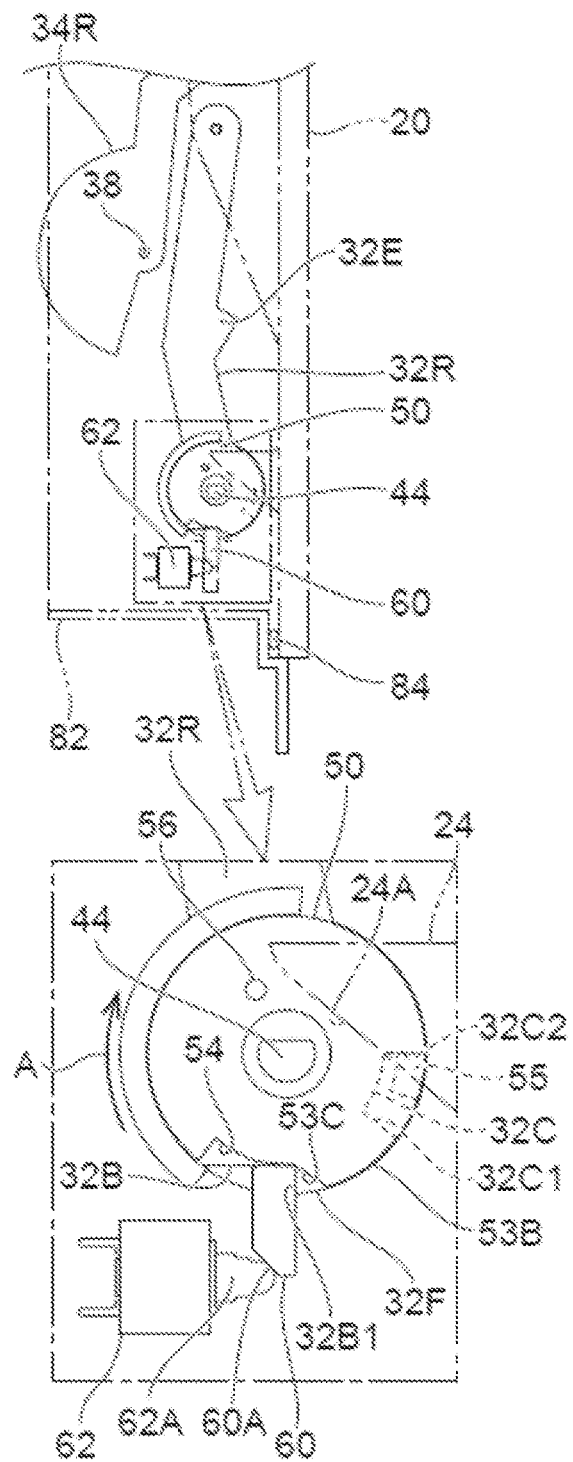
FIGS. 8A-8D are explanatory drawings for demonstrating the movement of the lid from a closed position shown in FIG. 1 to an open position.
Figure 8B:
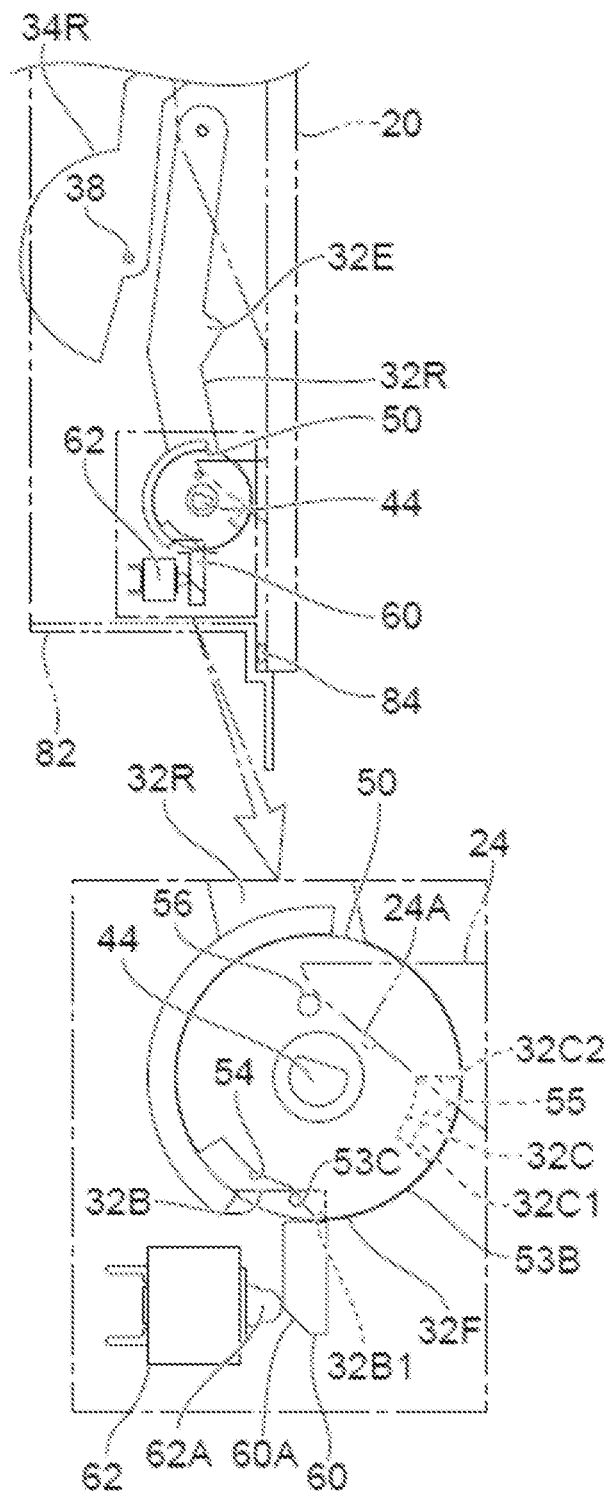

As shown in FIG. 8a, in the closed position of the lid 20, the link mechanism 30 is arranged in the retracted position stored in the receiving recess 82. Further, in this state, the rotating body 50 is arranged at the initial position. Further, the lock member 60 is arranged at the lock position, and the upper end portion of the lock member 60 is arranged in the cam recess 54 of the rotating body 50 and in the lock recess 32B of the first link 32R. The upper end of the lock member 60 engages with the first lock surface 32B1 of the first link 32R, and the rotation of the first link 32R to one side in the rotation direction is restricted. Therefore, the operation of the link mechanism 30 is blocked, and the rotation of the lid 20 from the closed position to the open position is restricted. On the other hand, in the differential connecting mechanism 70, the differential connecting shaft 55 of the rotating body 50 is arranged at the other end of the differential groove 32C of the first link 32R. That is, the rotating body 50 and the first link 32R are in a non-connected state with respect to the rotation of the rotating body 50 to one side in the rotation direction.

In this state, when the actuator 40 is operated by the control unit 46 to rotate the drive shaft 44 to one side in the rotation direction, the rotating body 50 rotates together with the drive shaft 44 from the initial position to one side in the rotation direction. When the rotating body 50 rotates, the upper end portion of the lock member 60 is pressed downward by the inclined cam surface 53C of the rotating body 50, and the lock member 60 is displaced downward from the lock position. When the upper end of the lock member 60 reaches one end of the second cam surface 53B of the rotating body 50, the lock member 60 is arranged at the unlocked position, and the lock member 60 presses the switch portion 62A of the detection switch 62 to the rear side (cf. the state of FIG. 8b). As a result, the engagement state between the lock member 60 and the first lock surface 32B1 is disengaged, and the first link 32R is allowed to rotate to one side in the rotation direction. That is, the operation of the link mechanism 30 is permitted. Further, an ON signal is output from the detection switch 62 to the control unit 46, and the control unit 46 detects the operation permission state of the link mechanism 30.

On the other hand, when the rotating body 50 at the initial position starts rotating to one side in the rotation direction, the rotating body 50 and the first link 32R are in a non-connected state by the differential connecting mechanism 70. Therefore, the differential connecting shaft 55 of the differential connecting mechanism 70 moves the differential groove 32C from the other end to the one end side, and the rotating body 50 rotates relative to the first link 32R. When the lock member 60 reaches the unlock position, the differential connecting shaft 55 reaches one end of the differential groove 32C and is arranged adjacent to the other side in the rotation direction with respect to the first engaged surface 32C1 of the differential groove 32C. As a result, after reaching the unlocked position of the lock member 60, the rotating body 50 and the first link 32R are connected to each other.

In this state, when the drive shaft 44 further rotates to one side in the rotation direction, the differential connecting shaft 55 presses the first engaged surface 32C1 of the differential groove 32C, and the rotating body 50 and the first link 32R rotate to one side in the rotation direction. As a result, the operation of the link mechanism 30 from the retracted position is started. Specifically, the first links 32L and 32R rotate to one side around the axis of the drive shaft 44 and the support shaft 36, the second links 34L and 34R rotate to one side around the axis of the support shaft 38, and the lid 20 is displaced from the closed position to the front side (cf. the state of FIG. 8c).

Figure 8C:
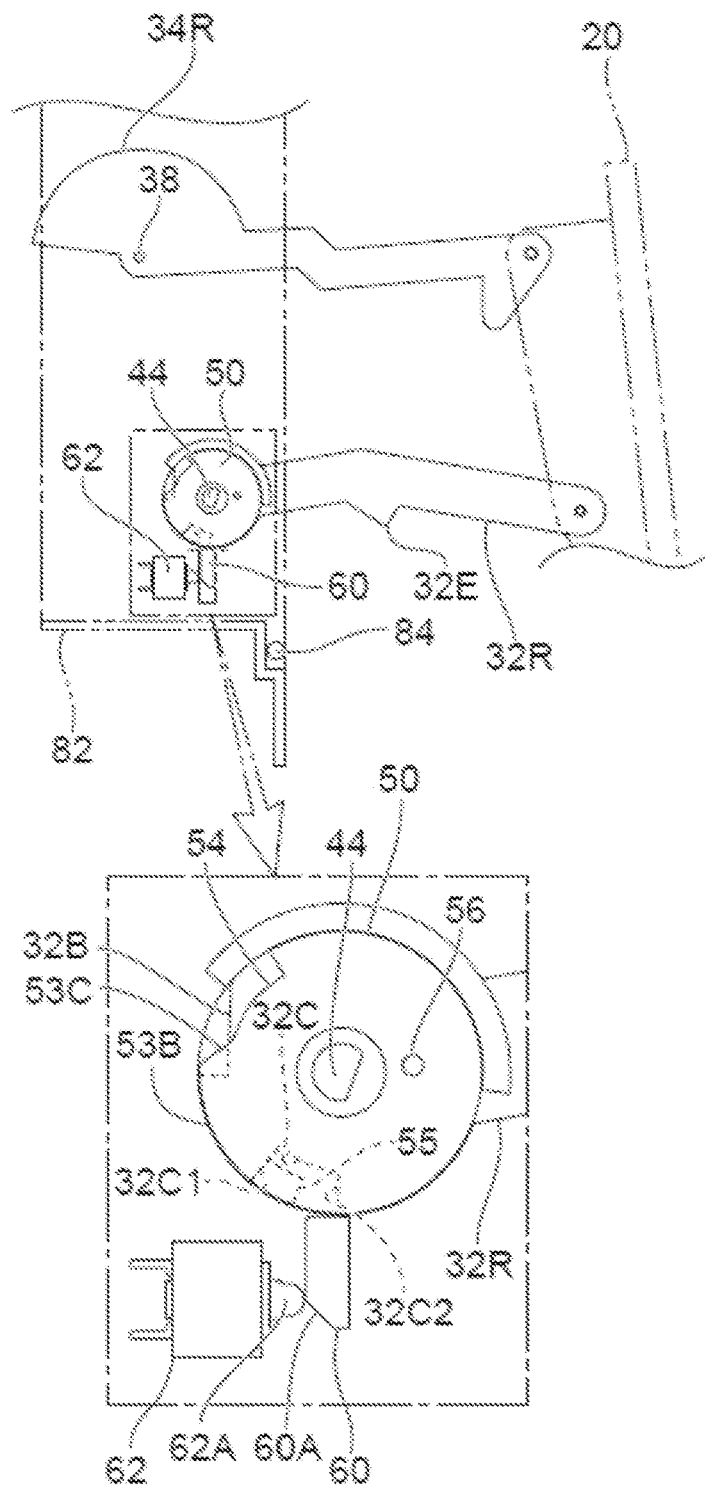
Figure 8D:
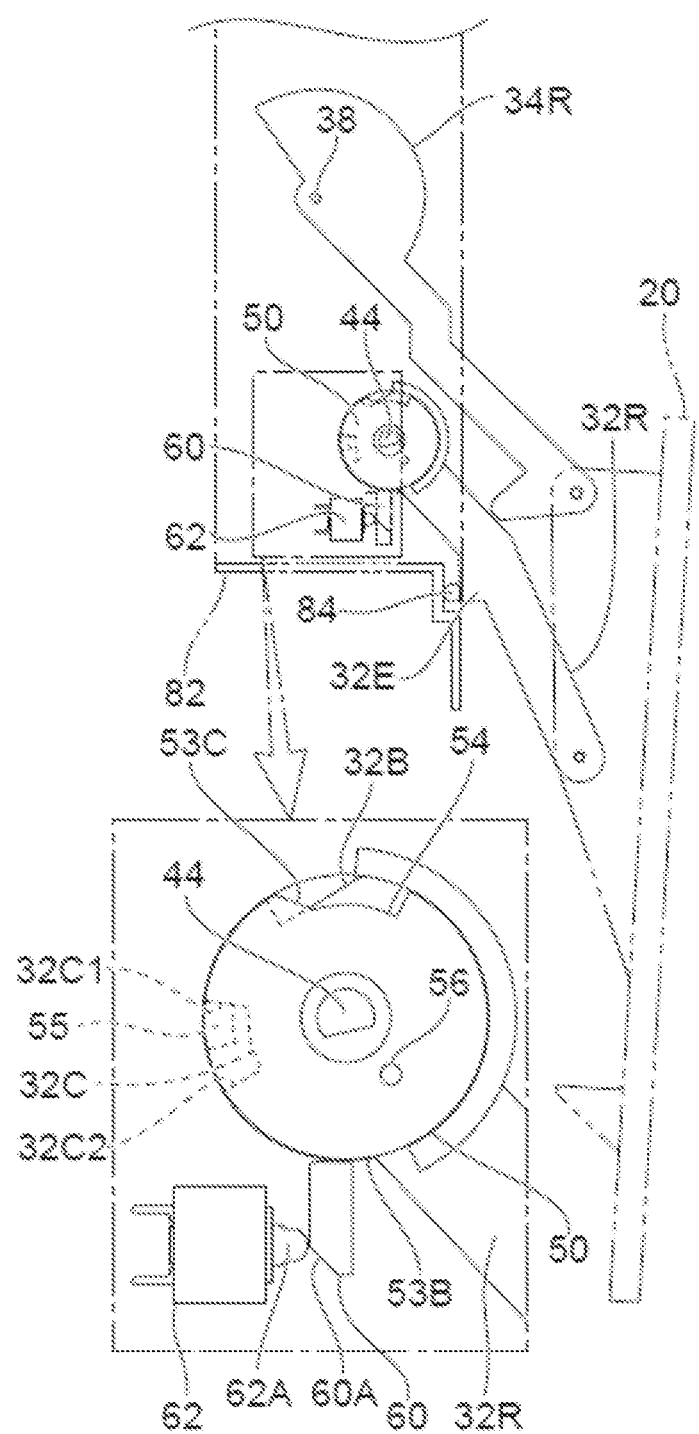

When the drive shaft 44 further rotates to one side in the rotation direction from the state of FIG. 8c, the link mechanism 30 is arranged in the deployed position and the lid 20 is arranged in the open position (cf. the state of FIG. 8d). Specifically, the lid 20 is displaced rearward and downward from the state of FIG. 8c, and is arranged at the open position. As a result, the opening of the receiving recess 82 is opened to the front side, and the receiving portion 86 is exposed. After reaching the open position of the lid 20, the control unit 46 stops the drive of the actuator 40. Further, at the deployed position of the link mechanism 30, the stopper portions 32E of the first links 32L and 32R come into contact with the lower portion of the seal member 84. As a result, the seal member 84 functions as a cushioning material. When the first link 32R and the rotating body 50 rotate to one side in the rotation direction (when rotating from the state (b) to the state (d) in FIG. 8), the link-side cam surface 32F of the first link 32R and the second cam surface 53B of the rotating body 50 slide on the upper end portion of the lock member 60 to maintain the unlocked position of the lock member 60.

(Movement of Lid 20 from Open Position to Closed Position by Driving Actuator 40)

As shown in FIG. 8d, at the open position of the lid 20, the link mechanism 30 is arranged at the deployed position. In this state, the upper end portion of the lock member 60 is in contact with the link side cam surface 32F of the first link 32R and the second cam surface 53B of the rotating body 50, and the lock member 60 is arranged at the unlocked position. Further, in the differential connecting mechanism 70, the differential connecting shaft 55 of the rotating body 50 is arranged at one end of the differential groove 32C of the first link 32R.

In this state, when the actuator 40 is operated by the control unit 46 to rotate the drive shaft 44 to the other side in the rotation direction, the rotating body 50 rotates together with the drive shaft 44 to the other side in the rotation direction. Here, as described above, the differential connecting shaft 55 of the rotating body 50 is arranged at one end of the differential groove 32C of the first link 32R. Therefore, the rotating body 50 and the first link 32R are in a non-connected state with respect to the rotation of the rotating body 50 to the other side in the rotation direction. As a result, when the rotating body 50 rotates to the other side in the rotation direction, the differential connecting shaft 55 moves to the other end side of the differential groove 32C, and the rotating body 50 rotates relative to the first link 32R. When the differential connecting shaft 55 reaches the other end of the differential groove 32C, the differential connecting shaft 55 is arranged adjacent to the second engaged surface 32C2 of the differential groove 32C on one side in the rotational direction, the rotating body 50 and the first link 32R are connected to each other with respect to the rotation of the rotating body 50 to the other side in the rotation direction (cf. the state of FIG. 9a).

Figure 9A:
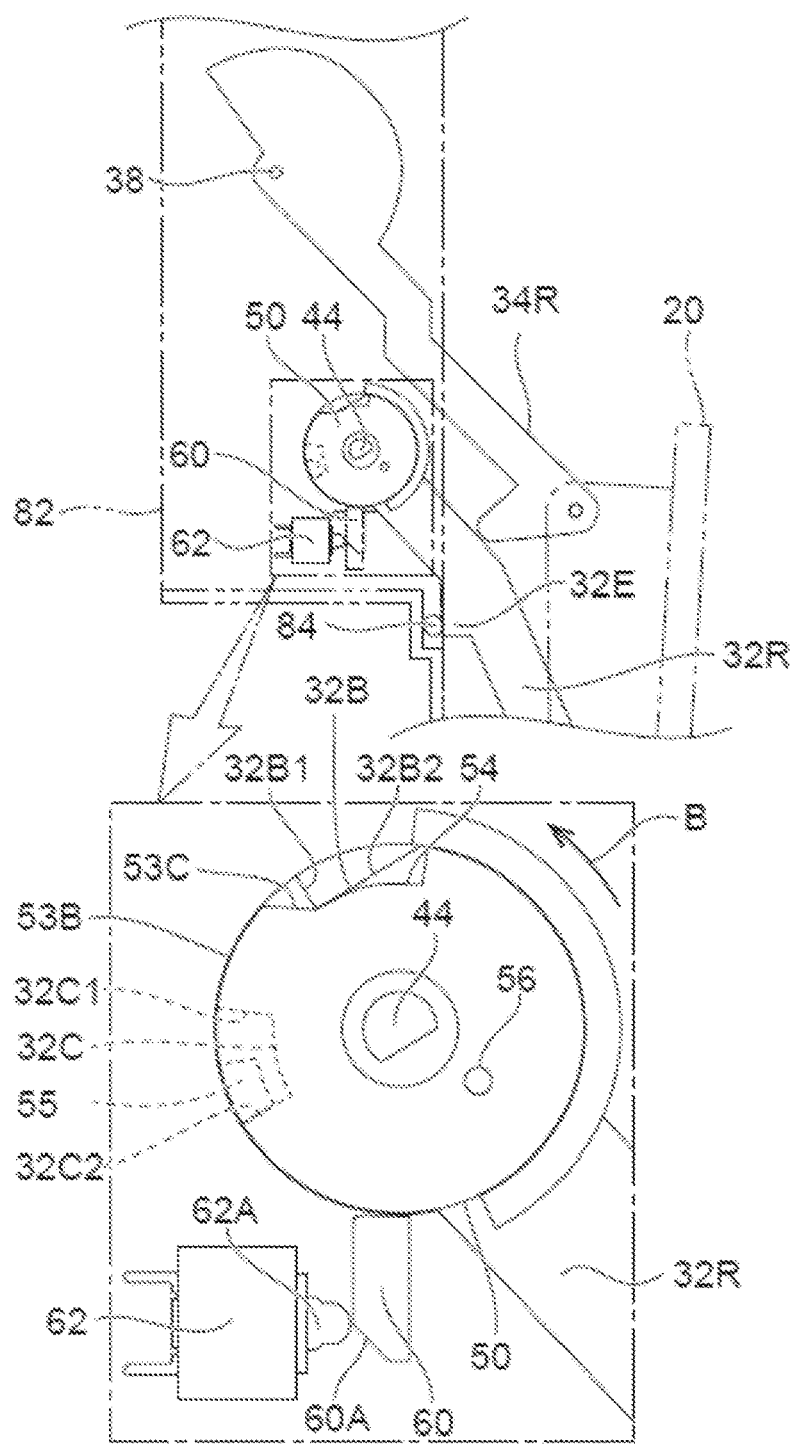
FIGS. 9A-C are explanatory drawings for demonstrating the movement of the lid from an open position shown in FIG. 2 to a closed position.

When the drive shaft 44 further rotates to the other side in the rotation direction from the state of FIG. 9a, the differential connecting shaft 55 presses the second engaged surface 32C2 of the differential groove 32C toward the other side in the rotation direction, and the rotating body 50 and the first link 32R rotate toward the other side in the rotation direction. Specifically, the first link 32R and the rotating body 50 rotate to the other side in the rotation direction while the link side cam surface 32F of the first link 32R and the second cam surface 53B of the rotating body 50 slide on the upper end portion of the lock member 60. As a result, the operation of the link mechanism 30 from the deployed position to the retracted position starts. When the operation of the link mechanism 30 from the deployed position starts, the first links 32L and 32R rotate to the other side around the axis of the drive shaft 44 and the support shaft 36, and the second links 34L and 34R rotate to the other side around the axis of the support shaft 38, and the lid 20 is displaced upward from the closed position. When the rotating body 50 and the first link 32R rotate to a position where one end of the link-side cam surface 32F of the first link 32R and the second cam surface 53B of the rotating body 50 reaches the upper end of the lock member 60, the lid 20 is arranged in front of the opening of the receiving recess 82 (cf. the state of FIG. 9b). In this state, the lock recess 32B of the first link 32R is arranged on one side in the rotation direction with respect to the lock member 60.

Figure 9B:
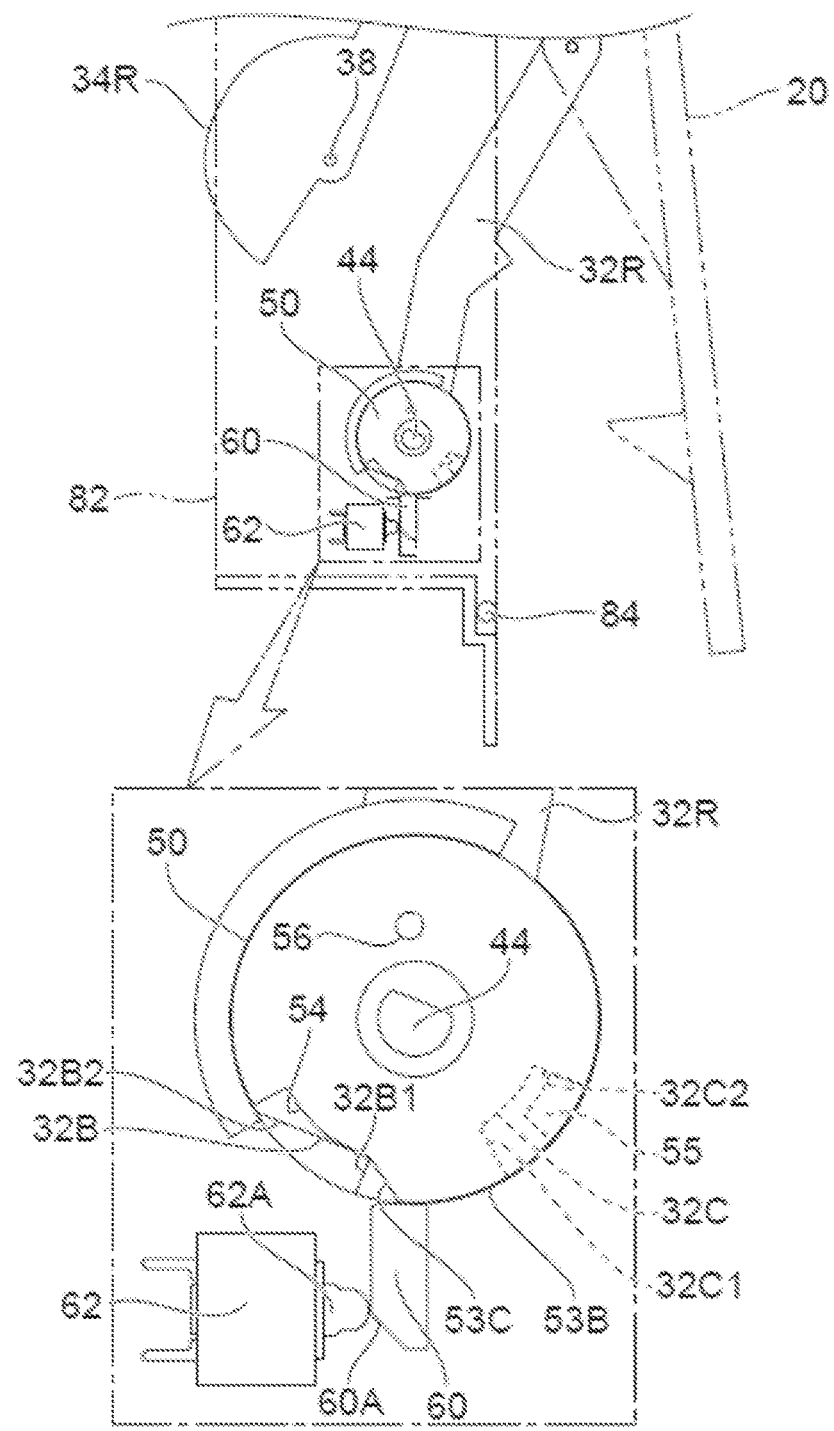
Figure 9C:
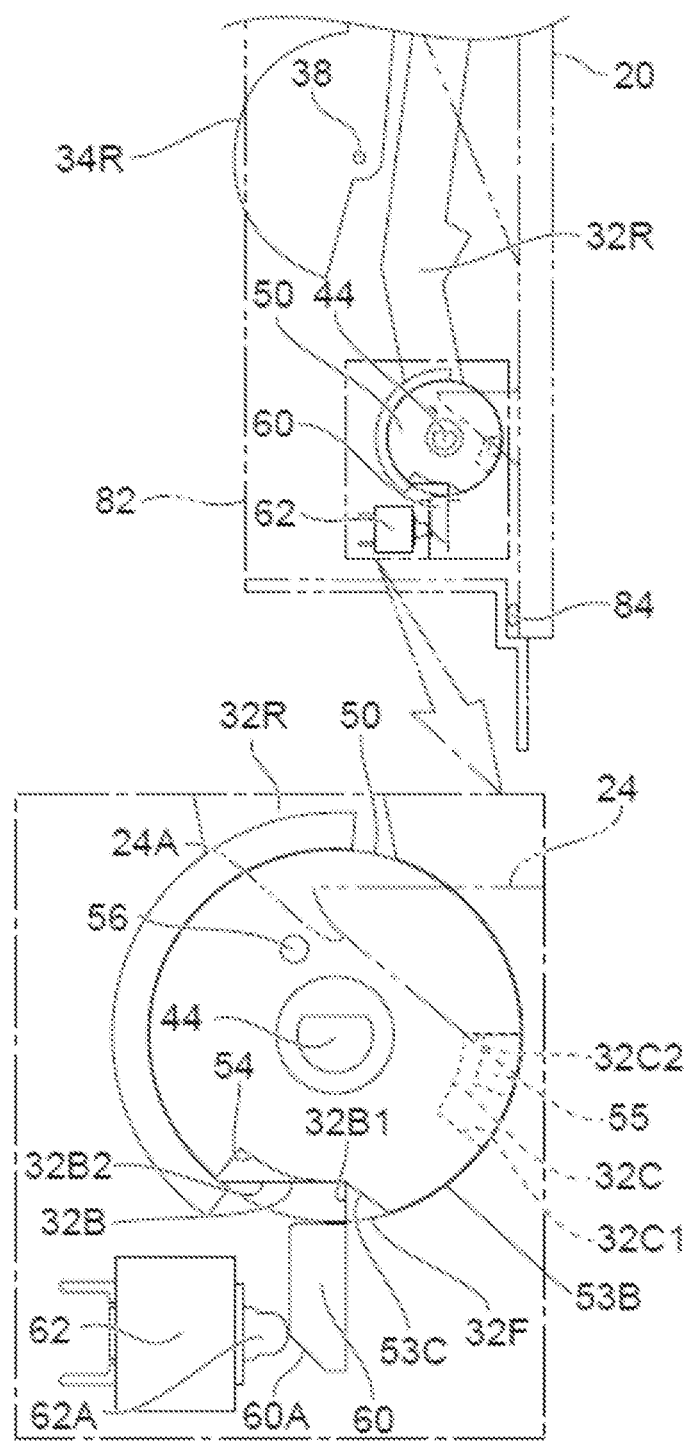

When the drive shaft 44 further rotates to the other side in the rotation direction from the state of FIG. 9b, the lid 20 is displaced to the rear side and is arranged in the closed position (cf. the state of FIG. 9c). At this time, the rotating body 50 is arranged at the initial position. Further, at this time, the first link 32R rotates while the link side cam surface 32F of the first link 32R slides on the upper end of the lock member 60, and the lock member 60 is arranged below the lock recess 32B of the first link 32R. As a result, the lock member 60 is displaced upward from the state of FIG. 9c and is arranged at the lock position by the urging force of the spring (not shown). That is, the upper end of the lock member 60 abuts on the second lock surface 32B2 of the lock recess 32B and engages with the first lock surface 32B1 of the lock recess 32B, and the rotation of the first link 32R to one side in the rotation direction is restricted. Therefore, the operation of the link mechanism 30 at the retracted position is prevented, and the rotation of the lid 20 from the closed position to the open position is restricted.

Further, at this time, the pressing of the lock member 60 against the switch portion 62A of the detection switch 62 is released. As a result, an off signal is output from the detection switch 62 to the control unit 46. Therefore, the control unit 46 detects that the lock member 60 is arranged at the lock position. In other words, the control unit 46 detects the operation blocking state of the link mechanism 30.

(Manual Operation of Lid 20 from Open Position to Closed Position)

As shown in FIG. 8d, at the open position of the lid 20, the link mechanism 30 is arranged at the deployed position as described above, and the differential connecting shaft 55 of the rotating body 50 is arranged at one end of the differential groove 32C of the first link 32R. In other words, the differential connecting shaft 55 is arranged adjacent to the first engaged surface 32C1 of the differential groove 32C on the other side in the rotation direction. In this state, when the lid 20 is manually moved to the closed position side, the lid 20 is displaced to the front side and the upper side, and the link mechanism 30 is operated from the deployed position. That is, the first links 32L and 32R rotate to the other side in the rotation direction. At this time, since the differential connecting shaft 55 is arranged adjacent to the first engaged surface 32C1 of the differential groove 32C on the other side in the rotation direction, the first engaged surface 32C1 of the differential groove 32C presses the differential connecting shaft 55, and the rotating body 50 and the drive shaft 44 rotate together with the first link 32R to the other side in the rotation direction. That is, while the rotating body 50 and the first link 32R start to rotate in the other side in the rotation direction after the rotating body 50 rotates relative to the first link 32R on the other side in the rotation direction when the actuator 40 moves the lid 20 from the open position to the closed position, the rotating body 50 and the first link 32R start to rotate to the other side in the rotation direction without the rotating body 50 rotating relative to the first link 32R on the other side in the rotation direction when moving the lid 20 from the open position to the closed position by manual operation.

Figure 10A:
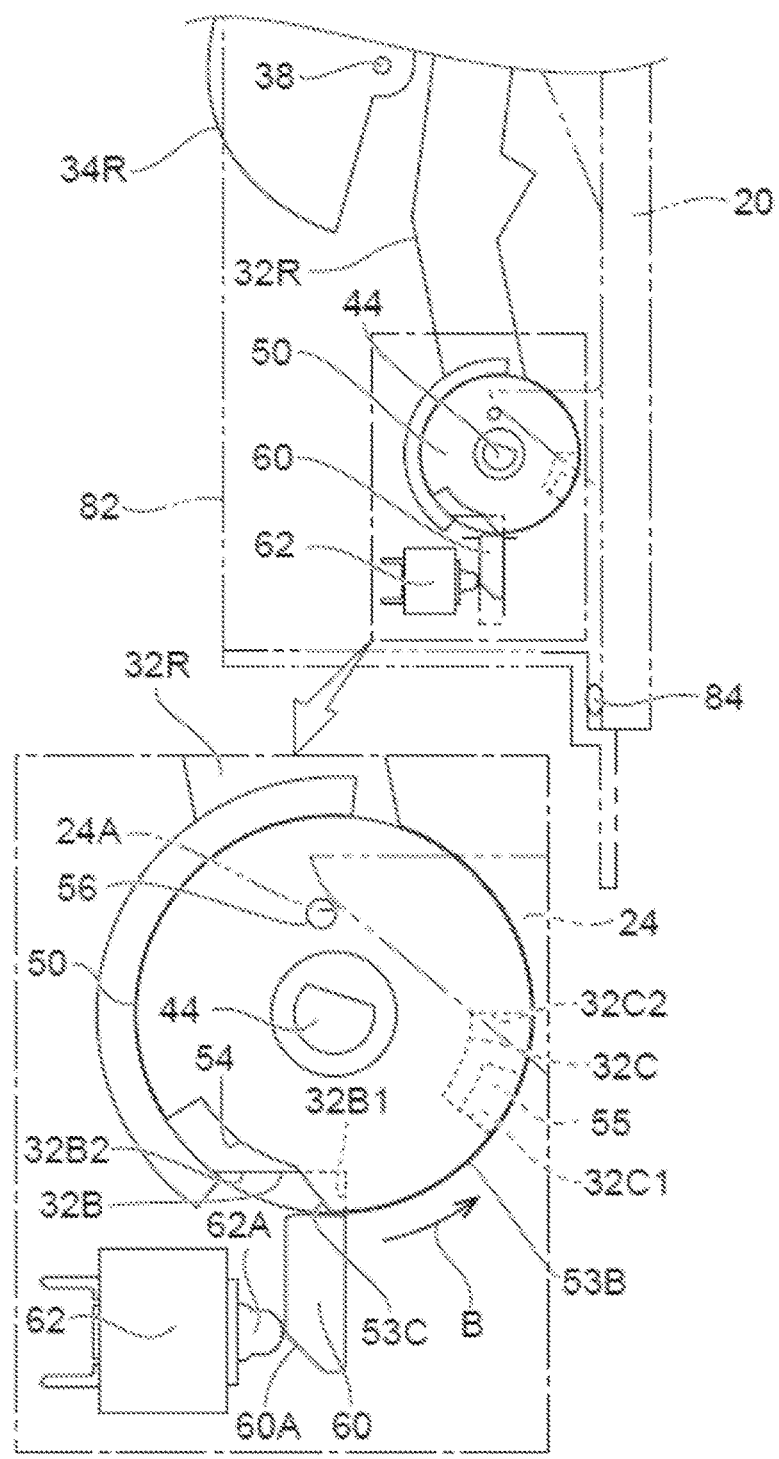
FIGS. 10A-C are explanatory drawings for demonstrating the operation when the lid is manually moved from an open position to a closed position.

Further, as shown in FIG. 10a, when the lid 20 is moved to the closed position, the link mechanism 30 is arranged at the retracted position. Here, in this state, since the differential connecting shaft 55 of the rotating body 50 is arranged at one end of the differential groove 32C of the first link 32R, the rotating body 50 is arranged at a position rotated to one side in the rotation direction from the initial position. That is, the first link 32R returns to the normal retracted position, but the rotating body 50 does not return to the initial position. Therefore, the upper end portion of the lock member 60 is in contact with one end portion of the second cam surface 53B of the rotating body 50, and the state of being arranged at the unlocked position of the lock member 60 is maintained. That is, the lid 20 is in the unlocked state. Further, in this state, the lock member 60 is arranged below the lock recess 32B of the first link 32R. Further, in this state, since the rotating body 50 is arranged at a position rotated to one side in the rotation direction from the initial position, the return pin 56 of the rotating body 50 is arranged adjacent to the rear side of the pressing inclined portion 24A of the pressing piece 24 of the lid 20.

Figure 10B:
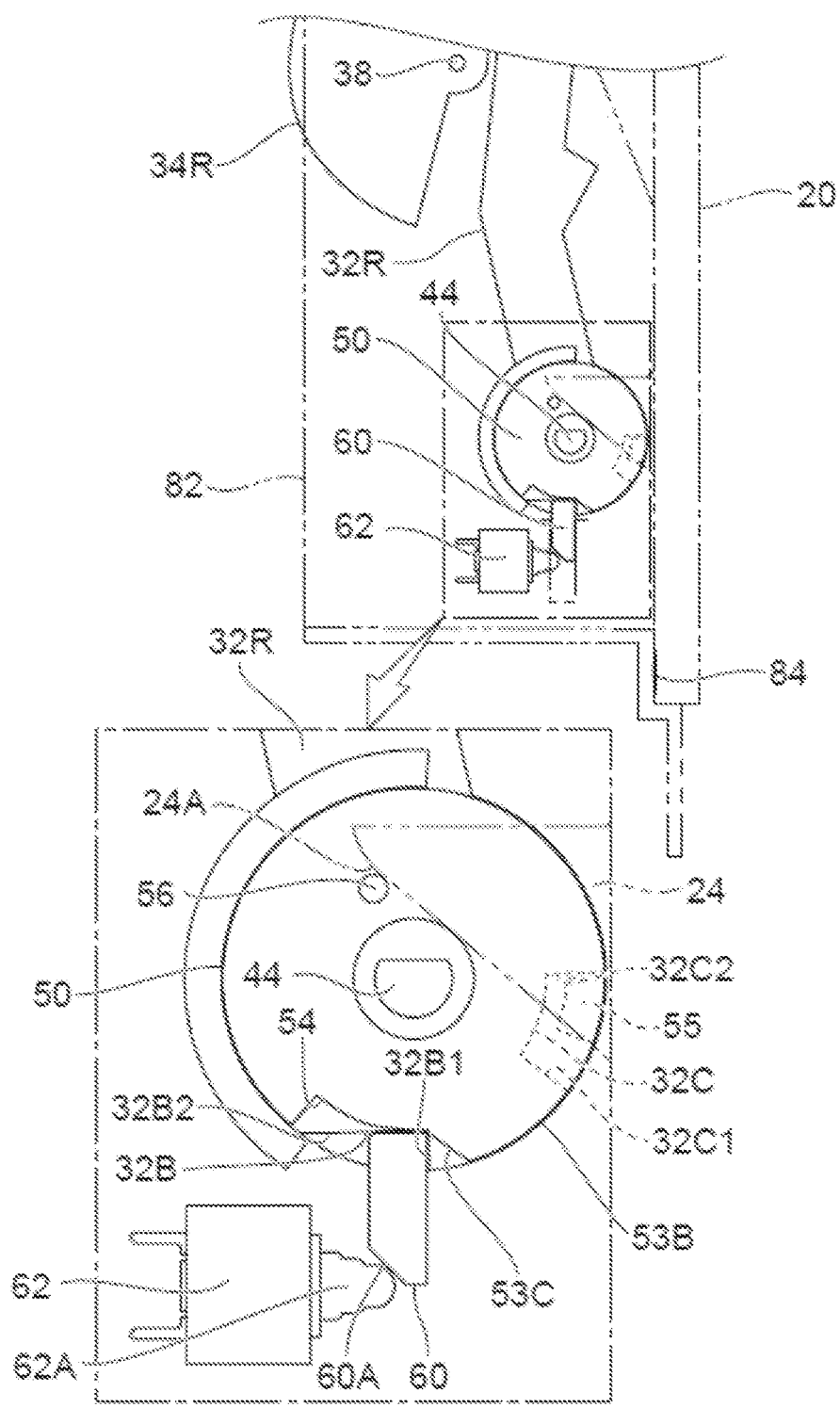

When the lid 20 is pressed to the rear side in this state, the seal member 84 is compressed and deformed, and the lid 20 is displaced to the rear side. As a result, the pressing inclined portion 24A of the pressing piece 24 of the lid 20 presses the return pin 56, and the rotating body 50 rotates in the other side in the rotation direction and is arranged at the initial position (cf. the state of FIG. 10b). Specifically, the differential connecting shaft 55 of the rotating body 50 moves from one end to the other end of the differential groove 32C of the first link 32R, and the rotating body 50 rotates relative to the first link 32R on the other side in the rotation direction.

Further, at this time, the upper end portion of the lock member 60 slides on the inclined cam surface 53C of the rotating body 50 to be displaced upward and is arranged at the lock position. As a result, the lock member 60 is arranged in the lock recess 32B of the first link 32R and engages with the first lock surface 32B1 to regulate the rotation of the first link 32R to one side in the rotation direction.

Figure 10C:
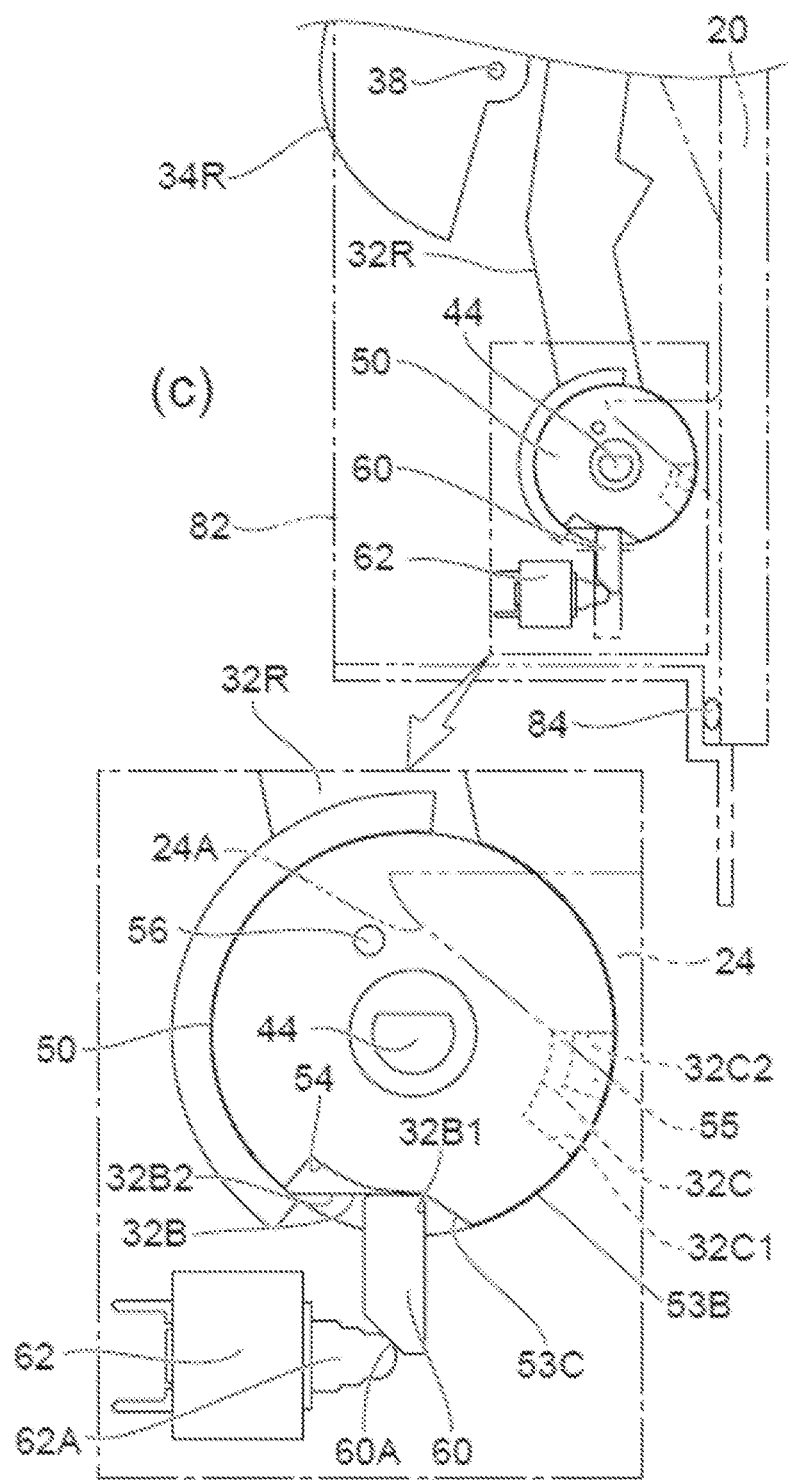

By releasing the pressure on the lid 20 to the rear side, the seal member 84 is elastically deformed, the lid 20 is displaced to the front side and arranged in the closed position (cf. the state of FIG. 10c). As a result, the rotating body 50 can be returned to the initial position even when the lid 20 is manually moved from the open position to the closed position.

As described above, in the lid opening and closing device 10 of the present embodiment, the lid 20 is connected to the receiving recess 82 by the link mechanism 30. Further, the hinge portion 32A of the first link 32R of the link mechanism 30 is rotatably supported on the drive shaft 44 of the actuator 40, and the rotating body 50 is integrally rotatably provided on the drive shaft 44. Further, at the closed position of the lid 20, the lock member 60 engages with the first link 32R of the link mechanism 30 to prevent the link mechanism 30 from operating from the retracted position. Therefore, the lock member 60 can lock the lid 20 in the closed position and regulate the operation of the lid 20 from the closed position to the open position.

Here, the rotating body 50 at the initial position rotates to one side in the rotation direction, so that the lock member 60 is disengaged from the first link 32R. Further, the first link 32R (link mechanism 30) and the rotating body 50 are provided with a differential connecting mechanism 70. Specifically, the differential groove 32C constituting the differential connecting mechanism 70 is provided on the first link 32R, and the differential connecting shaft 55 constituting the differential connecting mechanism 70 is provided on the rotating body 50. When rotating from the initial position of the rotating body 50 to one side in the rotation direction, after disengaging the lock member 60 with respect to the first link 32R, the differential connecting mechanism 70 connects the rotating body 50 and the first link 32R to operate the link mechanism 30 at the retracted position. That is, the rotating body 50, which is rotationally driven by the actuator 40, has two operations: an operation of disengaging the lock member 60 from engaging with the first link 32R, and an operation of transmitting the driving force of the actuator 40 to the link mechanism 30. The differential connecting mechanism 70 imparts a time difference between the above two operations of the rotating body 50. Therefore, the lock member 60 and the link mechanism 30 can be operated by rotationally driving the rotating body 50 by a single actuator 40. In other words, the locked state of the lid 20 can be released by utilizing the actuator 40 for operating the link mechanism 30 without separately providing a drive unit for unlocking the first link 32R of the lock member 60. Therefore, the lid 20 can be stably locked while suppressing the cost increase.

Further, as described above, the differential connecting mechanism 70 comprises a differential groove 32C provided in the first link 32R of the link mechanism 30, and a differential connecting shaft 55 provided in the rotating body 50. The differential groove 32C extends in the rotation direction of the rotating body 50, and the differential connecting shaft 55 is arranged at the other end of the differential groove 32C. As a result, while the differential connecting shaft 55 moves in the differential groove 32C, the rotating body 50 and the first link 32R can be disconnected from each other, and the rotating body 50 can be rotated relative to the first link 32R. Thereby, with a simple configuration, after the lock member 60 is disengaged from the first link 32R, the rotating body 50 and the first link 32R can be connected to operate the link mechanism 30 at the retracted position.

Further, the actuator 40 has a drive shaft 44, and the hinge portion 32A of the first link 32R of the link mechanism 30 is rotatably supported by the drive shaft 44. Further, the rotating body 50 is provided so as to be integrally rotatable on the drive shaft 44. As a result, the hinge portion 32A and the rotating body 50 are arranged coaxially. Therefore, it is possible to save space in the connecting portion between the rotating body 50 and the first link 32R.

Further, the lock member 60 is arranged on the radial outer side (lower side) of the rotating body 50, and is supported by the receiving recess 82 so as to be movable between the locked position and the unlocked position. Further, a cam surface 53 with which the upper end of the lock member abuts is formed on the outer peripheral portion of the rotating body 50, and the lock member 60 moves between the lock position and the unlock position by the cam surface 53. Therefore, with a simple configuration, the lock member 60 can be moved between the lock position and the unlock position when the rotating body 50 is rotated.

Further, the first link 32R and the rotating body 50 are arranged side by side in the axial direction of the drive shaft 44, and the lock member 60 is arranged so as to straddle the first link 32R and the rotating body 50. Further, the first link 32R is formed with a lock recess 32B configured to be engageable with the lock member 60. As a result, the rotating body 50, the first link 32R, and the lock member 60 can be collectively arranged.

Further, the lid 20 is provided with a pressing piece 24 projecting to the rear side, and the rotating body 50 is provided with a return pin 56 configured to be able to press the pressing piece 24. When the lid 20 is manually moved from the open position to the closed position, the rotating body 50 is arranged on one side in the rotation direction from the initial position, and the return pin 56 of the rotating body 50 is arranged adjacent to the rear side of the pressing piece 24 of the lid 20. Then, when the lid 20 at the closed position is displaced to the rear side, the pressing piece 24 presses the return pin 56, and the rotating body 50 is arranged at the initial position. Therefore, even if the rotating body 50 does not return to the initial position when the lid 20 is moved to the closed position by manual operation, the rotating body 50 can be returned to the initial position by pressing the lid 20 to the rear side.

In the present embodiment, in the differential connecting mechanism 70, the differential groove 32C is formed on the first link 32R, and the differential connecting shaft 55 is formed on the rotating body 50. Instead of this, the differential groove may be formed in the rotating body 50, and the differential connecting shaft may be formed in the first link 32R. In this case, at the retracted position of the link mechanism 30 and the initial position of the rotating body 50, the differential connecting shaft is arranged at one end of the rotating body 50 in the rotational direction in the differential groove.

Further, in the present embodiment, the differential groove 32C is opened to the radial outside of the hinge portion 32A of the first link 32R and to the rotating body 50 side, and extends in the rotating direction of the rotating body 50. Instead of this, the differential groove 32C may be formed in the shape of an elongated hole extending toward the rotating body 50 and extending in the rotation direction of the rotating body 50.

REFERENCE SIGNS LIST

10; Lid Opening and closing device
20; Lid
24; Pressing piece (reset portion)
30; Link mechanism
32R; First link (drive link member)
32B; Lock recess (engagement recess)
32C; Differential groove
40; Actuator (drive unit)
44; Drive shaft
50; Rotating body
53; Cam surface
55; Differential connecting shaft
56; Return pin (pressed portion)
60; Lock member
70; Differential connection mechanism
82; Receiving recess
86; Receiving portion

What is claimed is:

1. A lid opening and closing device comprising:
a lid provided in a receiving recess of a vehicle having a receiving portion inside, and configured to be movable between a closed position for closing the opening of the receiving recess and an open position for opening the opening;
a link mechanism that connects the lid and the receiving recess, arranged at a retracted position stored inside the receiving recess at the closed position of the lid, and moves the lid to the open position by operating from the retracted position;
a drive unit that serves as a drive source for operating the link mechanism;
a lock member that engages with the link mechanism at the retracted position to prevent the link mechanism from operating;
a rotating body that is rotationally driven by the drive unit, and rotates from the initial position to one side in the rotation direction to disengage the engagement of the lock member to the link mechanism;
a differential connecting mechanism provided on the link mechanism and the rotating body, and connects the rotating body and the link mechanism to operate the link mechanism at the retracted position after the lock member is disengaged from the link mechanism when rotating from the initial position of the rotating body to one side in the rotation direction.

2. The lid opening and closing device according to claim 1, wherein the differential connecting mechanism comprises:
a differential groove provided on one of the rotating body and the link mechanism, and extending in the rotation direction of the rotating body, and,
a differential connecting shaft provided on the other of the rotating body and the link mechanism, and arranged at one end or the other end of the differential groove.

3. The lid opening and closing device according to claim 2, wherein;
the drive unit has a drive shaft,
the link mechanism has a drive link member with which the lock member is engaged, and one end of the drive link member is rotatably supported by the drive shaft, and,
the rotating body is integrally rotatably connected to the drive shaft.

4. The lid opening and closing device according to claim 3, wherein;
the lock member is arranged on the radial outer side of the rotating body, and configured to be movable between a lock position that engages with the drive link member and an unlock position that is disengaged from the drive link member, and,
a cam surface is formed on the outer peripheral portion of the rotating body so that the lock member is in contact with the cam surface and the lock member is moved between the lock position and the unlock position.

5. The lid opening and closing device according to claim 4, wherein;
the rotating body and the drive link member are arranged side by side in the axial direction of the drive shaft,
the lock member is arranged so as to straddle the rotating body and the drive link member, and
the drive link member is formed with an engaging recess that is open outward in the radial direction of the drive shaft and configured to be able to be engaged with the lock member.

6. The lid opening and closing device according to claim 1, wherein;
the lid is provided with a reset portion protruding toward the receiving recess side,
the rotating body is provided with a pressed portion configured to be pressable at the reset portion, and
in a state where the rotating body is arranged on one side in the rotation direction from the initial position, the lid in the closed position is displaced toward the receiving recess side, so that the reset portion presses the pressed portion and the rotating body returns to the initial position.

7. The lid opening and closing device according to claim 2, wherein;
the lid is provided with a reset portion protruding toward the receiving recess side,
the rotating body is provided with a pressed portion configured to be pressable at the reset portion, and in a state where the rotating body is arranged on one side in the rotation direction from the initial position, the lid in the closed position is displaced toward the receiving recess side, so that the reset portion presses the pressed portion and the rotating body returns to the initial position.

8. The lid opening and closing device according to claim 3, wherein;
the lid is provided with a reset portion protruding toward the receiving recess side,
the rotating body is provided with a pressed portion configured to be pressable at the reset portion, and in a state where the rotating body is arranged on one side in the rotation direction from the initial position, the lid in the closed position is displaced toward the receiving recess side, so that the reset portion presses the pressed portion and the rotating body returns to the initial position.

9. The lid opening and closing device according to claim 4, wherein;
the lid is provided with a reset portion protruding toward the receiving recess side,
the rotating body is provided with a pressed portion configured to be pressable at the reset portion, and in a state where the rotating body is arranged on one side in the rotation direction from the initial position, the lid in the closed position is displaced toward the receiving recess side, so that the reset portion presses the pressed portion and the rotating body returns to the initial position.

10. The lid opening and closing device according to claim 5, wherein;

the lid is provided with a reset portion protruding toward the receiving recess side, the rotating body is provided with a pressed portion configured to be pressable at the reset portion, and in a state where the rotating body is arranged on one side in the rotation direction from the initial position, the lid in the closed position is displaced toward the receiving recess side, so that the reset portion presses the pressed portion and the rotating body returns to the initial position.

* * * * *